United States Patent [19]
Sawahashi et al.

[11] Patent Number: 5,898,665
[45] Date of Patent: Apr. 27, 1999

[54] COHERENT TRACKING APPARATUS AND METHOD FOR CDMA RECEIVER

[75] Inventors: Mamoru Sawahashi, Yokosuka; Fumiyuki Adachi, Yokohama, both of Japan

[73] Assignee: NTT Mobile Communications Network, Inc., Japan

[21] Appl. No.: 08/702,526

[22] PCT Filed: Jan. 5, 1996

[86] PCT No.: PCT/JP96/00006

§ 371 Date: Aug. 30, 1996

§ 102(e) Date: Aug. 30, 1996

[87] PCT Pub. No.: WO96/21294

PCT Pub. Date: Jul. 11, 1996

[30] Foreign Application Priority Data

Jan. 5, 1995 [JP] Japan ................................... 7-000378
Jan. 20, 1995 [JP] Japan ................................... 7-007205

[51] Int. Cl.[6] .............................. H04J 13/04; H04L 7/00
[52] U.S. Cl. ......................... 370/342; 370/350; 375/208; 375/325; 375/371
[58] Field of Search ................................... 370/320, 335, 370/342, 441, 479, 491, 500, 350; 375/200, 205, 206, 208, 325, 326, 327, 371; 329/304

[56] References Cited

U.S. PATENT DOCUMENTS 5,477,195  12/1995  Spilker ....................................... 331/11
5,638,362  6/1997  Dohi et al. ............................... 370/342
5,640,416  6/1997  Chalmers ................................. 375/206
5,691,974  11/1997  Zehavi et al. ........................... 370/203
5,737,362  4/1998  Hyun et al. .............................. 345/206

FOREIGN PATENT DOCUMENTS 7-177125  7/1995  Japan .
7-264112  10/1995  Japan .

Primary Examiner—Hassan Kizou
Attorney, Agent, or Firm—Rogers & Wells LLP

[57] ABSTRACT

A coherent tracking apparatus for a CDMA receiver capable of achieving high accuracy tracking by suppressing noise. It includes a demodulation correlator for detecting correlation between a received spread signal and a demodulation spreading code replica inphase with a received spreading code included in the received spread signal by multiplying them, an absolute coherent detector for demodulating information data through absolute coherent detection of the correlation signal (despread signal) fed from the demodulation correlator, a tracking correlator for detecting correlation by multiplying the received spread signal by a pair of tracking spreading code replicas whose phases are shifted by ±½ chip period from the phase of the demodulation spreading code replica, a decided code corrector for performing reverse modulation of the difference (phase error signal) between the outputs of the tracking correlators with the output of the absolute coherent detector to remove modulated components of the information data included in the phase error signal, and a spreading code replica generator for generating the demodulation spreading code replica and the tracking spreading code replicas by carrying out phase control using the phase error signal output from the corrector.

18 Claims, 24 Drawing Sheets

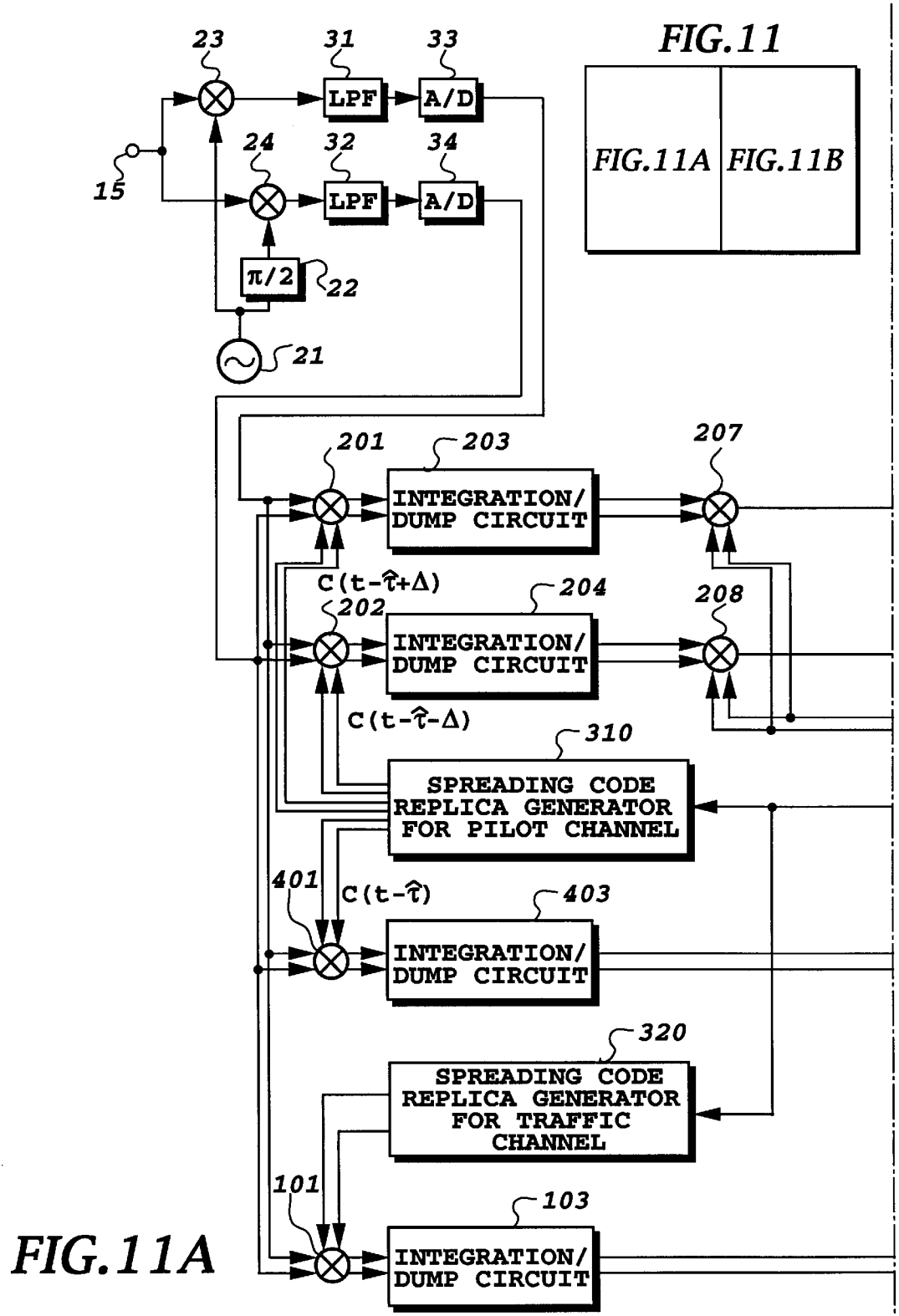

| FIG.14A | FIG.14B |
|---------|---------|

COHERENT TRACKING APPARATUS AND METHOD FOR CDMA RECEIVER

TECHNICAL FIELD

The present invention relates to a radio receiver in mobile communications, and more particularly to a coherent tracking apparatus and method for a receiver in a CDMA (Code Division Multiple Access) system using spread spectrum.

BACKGROUND ART

As is well known, it is necessary for a direct sequence receiver to synchronize a replica of a spreading code generated in the receiver with the spreading code in a received spread signal. The synchronization process falls into initial acquisition and tracking.

FIG. 1 is a block diagram showing a conventional DLL (Delay Locked Loop) used for the tracking. A spreading code replica is generated by a spreading code replica generator 1, and spreading codes whose phases are advanced and lagged by one chip with respect to the spreading code replica are fed to multipliers 3 and 4, respectively. The multipliers 3 and 4 take correlation between these spreading codes and the received spread signal. The correlation signals output from the multipliers 3 and 4 are passed through BPFs 5 and 6 which remove spurious high frequency components, and undergo square-law detection by square-law detectors 7 and 8. The outputs of the square-law detectors 7 and 8 are added in opposite phase by an adder 10 so that the phase error components are extracted between the received spreading code and the spreading code replica. The phase error components obtained are passed through a loop filter 11, and fed back to a voltage controlled clock generator 1. Thus, the generating phase of the spreading code replica is controlled so that its phase matches that of the received spreading code.

In this DLL, the signals after the correlation are passed through the square-law detectors to remove the residual frequency components of the carrier after the quadrature detection, or to remove the modulated components of the information data, which are contained in the signals after the correlation. Although this method has an advantage that the phase error can be easily extracted between the received spreading code and the spreading code replica, it has a disadvantage that noise and tracking jitter are increased because the noise components are also squared.

DISCLOSURE OF THE INVENTION

An object of the present invention is to provide a coherent tracking apparatus and method for a CDMA receiver, which can achieve high accuracy tracking.

In a first aspect of the present invention, there is provided a coherent tracking apparatus for a CDMA receiver for use in a CDMA system that performs multiple access transmission by transmitting and receiving a spread signal, the spread signal being generated by spreading a pilot signal of a known pattern and an information data signal into a wideband signal with a spreading code whose rate is higher than a rate of an information symbol, the pilot signal and the information data signal being alternated at a fixed pilot period, the coherent tracking apparatus comprising:

demodulation spreading code replica generating means for generating a demodulation spreading code replica inphase with a spreading code in a received spread signal;

tracking spreading code replica generating means for generating at least a pair of tracking spreading code replicas whose phases are equal to a phase of the demodulation spreading code replica plus and minus a predetermined value, respectively;

demodulation correlator means for detecting correlation between the received spread signal and the demodulation spreading code replica;

phase error detection means for extracting the pilot signal from an output of the demodulation correlator means, and for detecting phase errors of the pilot signal;

first delay means for delaying by at least the pilot period the information data signal in the output of the demodulation correlator means;

first phase compensator for compensating each symbol of the information data signal output from the first delay means by interpolating the phase errors of the pilot signal into a section of the information data signal;

demodulation means for demodulating each symbol of the information data signal by deciding an output of the first phase compensator;

at least a pair of tracking correlator means for detecting correlation between the received spread signal and the tracking spreading code replicas;

an adder for adding outputs of the tracking correlator means in opposite phases to produce a first phase error signal;

second delay means connected to one of an output of the tracking correlator means and an output of the adder for delaying the first phase error signal by at least the pilot period;

reverse modulation means for reversely modulating the first phase error signal with an output of the demodulation means to remove modulated components of the information data signal, which are included in the first phase error signal, thereby producing a second phase error signal; and control means for controlling the demodulation spreading code replica generating means and the tracking spreading code replica generating means with the second phase error signal.

Here, the coherent tracking apparatus for the CDMA receiver may further comprise a second phase compensator connected between the tracking correlator means and the adder, wherein the adder adds outputs of the second phase compensator in opposite phases.

The coherent tracking apparatus for the CDMA receiver may further comprise a second phase compensator connected between the reverse modulation means and the control means.

The demodulation spreading code replica generating means and the tracking spreading code replica generating means may comprise a common voltage controlled clock generator.

The control means may comprise a loop filter for supplying the voltage controlled clock generator with a control voltage based on the second phase error signal.

The demodulation correlator means may comprise a multiplier for multiplying the received spread signal by the demodulation spreading code replica, and an integration/dump circuit for integrating an output of the multiplier for one symbol period, and wherein the tracking correlator means may comprise a multiplier for multiplying the received spread signal by the tracking spreading code replica, and an integration/dump circuit for integrating an output of the multiplier for one symbol period.

The tracking spreading code replica generating means may generate a plurality of tracking spreading code replicas whose phases are shifted by ±KΔ from the phase of the demodulation spreading code replica, where Δ is a predetermined value and K=1, 2, ... N, and wherein the coherent tracking apparatus further comprising:

selection means for selecting two correlation values from an output of the tracking correlator means to supply the adder with the two correlation values, the two correlation values being taken between the received spread signal and a pair of tracking spreading code replicas whose phases differ from the phase of the demodulation spreading code replica by ±Δ.

The controlling means may generate a third phase error signal by averaging the second phase error signal, and may command the pilot spreading code replica generating means and the information data spreading code replica generating means to shift phases of the pilot spreading code replica and the information data spreading code replica when the phase error signal exceeds a predetermined threshold value.

The selection means may shift selection of the demodulation spreading code replica and the tracking spreading code replicas in response to a command of the controlling means when the controlling means commands a shift of the phases.

In a second aspect of present invention, there is provided a coherent tracking apparatus for a CDMA receiver for use in a CDMA system that performs multiple access transmission by transmitting and receiving a pilot spread signal through a pilot channel, and information data spread signal through traffic channels, the pilot spread signal being generated by spreading a pilot signal of a known pattern into a wideband signal with a pilot spreading code whose rate is higher than a rate of an information symbol, the information data spread signal being generated by spreading an information data signal into a wideband signal with an information data spreading code different from the pilot spreading code, the coherent tracking apparatus comprising:

pilot spreading code replica generating means for generating a pilot spreading code replica inphase with a pilot spreading code in the pilot spread signal;

information data spreading code replica generating means for generating an information data spreading code replica inphase with an information data spreading code in the information data spread signal;

tracking spreading code replica generating means for generating a pair of tracking spreading code replicas whose phases are equal to a phase of the pilot spreading code replica plus and minus a predetermined value Δ, respectively;

pilot correlator means for detecting correlation between the pilot spread signal and the pilot spreading code replica;

phase error detection means for detecting phase errors of the pilot signal from an output of the pilot correlator means;

information data correlator means for detecting correlation between the information data spread signal and the information data spreading code replica;

first phase compensator for compensating individual symbols of the information data signal output from the information data correlator means by the phase errors of the pilot signal, the phase errors corresponding to the individual symbols of the information data signal;

demodulation means for demodulating each symbol of the information data signal by deciding an output of the first phase compensator;

a pair of tracking correlator means for detecting correlation between the pilot spread signal and the tracking spreading code replicas;

an adder for adding outputs of the tracking correlator means in opposite phases to produce a first phase error signal;

reverse modulation means for reversely modulating the first phase error signal with an output of the demodulation means to remove modulated components of the information data signal, which are included in the first phase error signal, thereby producing a second phase error signal; and control means for controlling the pilot spreading code replica generating means, the information data spreading code replica generating means and the tracking spreading code replica generating means with the second phase error signal.

Here, the coherent tracking apparatus for the CDMA receiver may further comprise a second phase compensator connected between the tracking correlator means and the adder, wherein the adder adds outputs of the second phase compensator in opposite phases.

The coherent tracking apparatus for the CDMA receiver may further comprise a second phase compensator connected between the reverse modulation means and the control means.

The pilot spreading code replica generating means, the demodulation spreading code replica generating means and the tracking spreading code replica generating means may comprise a common voltage controlled clock generator.

The control means may comprise a loop filter for supplying the voltage controlled clock generator with a control voltage based on the second phase error signal.

The pilot correlator may comprise a multiplier for multiplying the received spread signal by the pilot spreading code replica, and an integration/dump circuit for integrating an output of the multiplier for one symbol period, wherein the demodulation correlator means comprises a multiplier for multiplying the received spread signal by the demodulation spreading code replica, and an integration/dump circuit for integrating an output of the multiplier for one symbol period, and wherein the tracking correlator means comprises a multiplier for multiplying the received spread signal by the tracking spreading code replica, and an integration/dump circuit for integrating an output of the multiplier for one symbol period.

In a third aspect of present invention, there is provided a coherent tracking method for a CDMA receiver for use in a CDMA system that performs multiple access transmission by transmitting and receiving a spread signal, the spread signal being generated by spreading a pilot signal of a known pattern and an information data signal into a wideband signal with a spreading code whose rate is higher than a rate of an information symbol, the pilot signal and the information data signal being alternated at a fixed pilot period, the coherent tracking method comprising:

demodulation spreading code replica generating step of generating a demodulation spreading code replica inphase with a spreading code in a received spread signal;

tracking spreading code replica generating step of generating at least a pair of tracking spreading code replicas whose phases are equal to a phase of the demodulation spreading code replica plus and minus a predetermined value, respectively;

demodulation correlation step of detecting correlation between the received spread signal and the demodulation spreading code replica;

phase error detection step of extracting the pilot signal from an output of the demodulation correlation step, and for detecting phase errors of the pilot signal;

first delay step of delaying by at least the pilot period the information data signal in the output of the demodulation correlator step;

first phase compensation step of compensating each symbol of the information data signal output at the first delay step by interpolating the phase errors of the pilot signal into a section of the information data signal;

demodulation step of demodulating each symbol of the information data signal by deciding an output of the first phase compensation step;tracking correlation step of detecting correlation between the received spread signal and the tracking spreading code replicas;

adding step of adding outputs of the tracking correlator step in opposite phases to produce a first phase error signal;

second delay step of delaying the first phase error signal by at least the pilot period;

reverse modulation step of reversely modulating the first phase error signal with an output of the demodulation step to remove modulated components of the information data signal, which are included in the first phase error signal, thereby producing a second phase error signal; and control step of controlling the demodulation spreading code replica generating step and the tracking spreading code replica generating step with the second phase error signal.

Here, the tracking spreading code replica generating step may generate a plurality of tracking spreading code replicas whose phases are shifted by $\pm K\Delta$ from the phase of the demodulation spreading code replica, where $\Delta$ is a predetermined value and $K=1, 2, \ldots N$, and wherein the coherent tracking method further comprising:

selection step of selecting two correlation values from an output of the tracking correlation step to supply the adding step with the two correlation values, the two correlation values being taken between the received spread signal and a pair of tracking spreading code replicas whose phases differ from the phase of the demodulation spreading code replica by $\pm\Delta$.

In a fourth aspect of present invention, there is provided a coherent tracking method for a CDMA receiver for use in a CDMA system that performs multiple access transmission by transmitting and receiving a pilot spread signal through a pilot channel, and information data spread signal through traffic channels, the pilot spread signal being generated by spreading a pilot signal of a known pattern into a wideband signal with a pilot spreading code whose rate is higher than a rate of an information symbol, the information data spread signal being generated by spreading an information data signal into a wideband signal with an information data spreading code different from the pilot spreading code, the coherent tracking method comprising:

pilot spreading code replica generating step of generating a pilot spreading code replica inphase with a pilot spreading code in the pilot spread signal;

information data spreading code replica generating step of generating an information data spreading code replica inphase with an information data spreading code in the information data spread signal;

tracking spreading code replica generating step of generating a pair of tracking spreading code replicas whose phases are equal to a phase of the pilot spreading code replica plus and minus a predetermined value A, respectively;

pilot correlation step of detecting correlation between the pilot spread signal and the pilot spreading code replica;

phase error detection step of detecting phase errors of the pilot signal from an output of the pilot correlation step;

information data correlation step of detecting correlation between the information data spread signal and the information data spreading code replica;

first phase compensation step of compensating individual symbols of the information data signal output from the information data correlation step by the phase errors of the pilot signal, the phase errors corresponding to the individual symbols of the information data signal;

demodulation step of demodulating each symbol of the information data signal by deciding an output of the first phase compensation step;tracking correlator steps of detecting correlation between the pilot spread signal and the tracking spreading code replicas;

adding step of adding outputs of the tracking correlator step in opposite phases to produce a first phase error signal;

reverse modulation step of reversely modulating the first phase error signal with an output of the demodulation step to remove modulated components of the information data signal, which are included in the first phase error signal, thereby producing a second phase error signal; and control step of controlling the pilot spreading code replica generating step, the information data spreading code replica generating step and the tracking spreading code replica generating step with the second phase error signal.

The present invention uses one of the I (inphase) and Q (quadrature) components of the signal after the correlation in the tracking system, and generates the phase error signal by extracting the phase error between the received spreading code and the spreading code replica. This makes it possible to reduce the average noise power by 3 dB in comparison with the conventional method employing the square-law detection. To achieve this even in a fading environment in which the received phase varies at random, the phase variations of the received signal must be estimated and compensated instantaneously so that the modulated components of the information data contained in the phase error signal are eliminated by performing the polar correction using decided data (which will be described later). The present invention solves this problem by estimating and compensating the phase variations with the pilot signals, by obtaining the decision data through absolute coherent detection of the phase compensated information symbols, and by carrying out reverse modulation of the phase error signal using the decision data.

BRIEF DESCRIPTION OF THE DRAWINGS

FIGS. 8A–8C are diagrams showing waveforms of various portions of the conventional DLL, wherein FIG. 8A illustrates the I-channel output of the BPF 5 of FIG. 1, FIG. 8B illustrates the Q-channel output of the BPF 5, and FIG. 8C illustrates the output of the square-law detector 7;

FIGS. 9A and 9B are diagrams showing various portions of the coherent tracking apparatus in accordance with the present invention, wherein FIG. 9A illustrates the output of an integration/dump circuit 203, and FIG. 9B illustrates the output of a decided code corrector 150;

FIG. 10 shows arrangement of FIGS. 10A and 10B, FIG. 11 shows arrangement of FIGS. 11A and 11B, and;

FIGS. 10A, 10B, 11A and 11B are block diagrams showing a second embodiment of the coherent tracking apparatus for the CDMA receiver in accordance with the present invention;

BEST MODE FOR CARRYING OUT THE INVENTION

The invention will now be described with reference to the accompanying drawings.

EMBODIMENT 1

Figure 2:
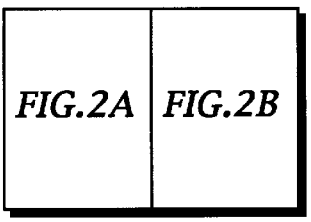
FIG. 2 shows arrangement of FIGS. 2A and 2B.
Figure 2A:
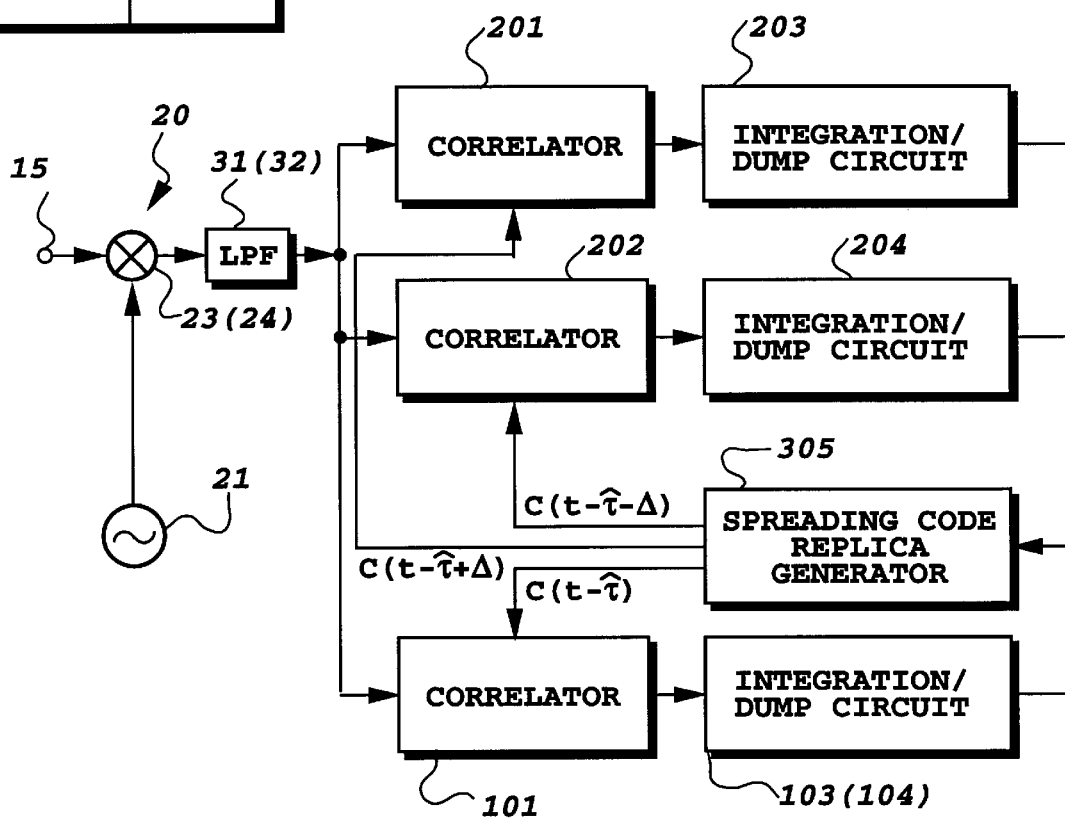
FIGS. 2A, 2B, 3A and 3B are block diagrams showing a first embodiment of a coherent tracking apparatus for a CDMA receiver in accordance with the present invention.
Figure 2B:
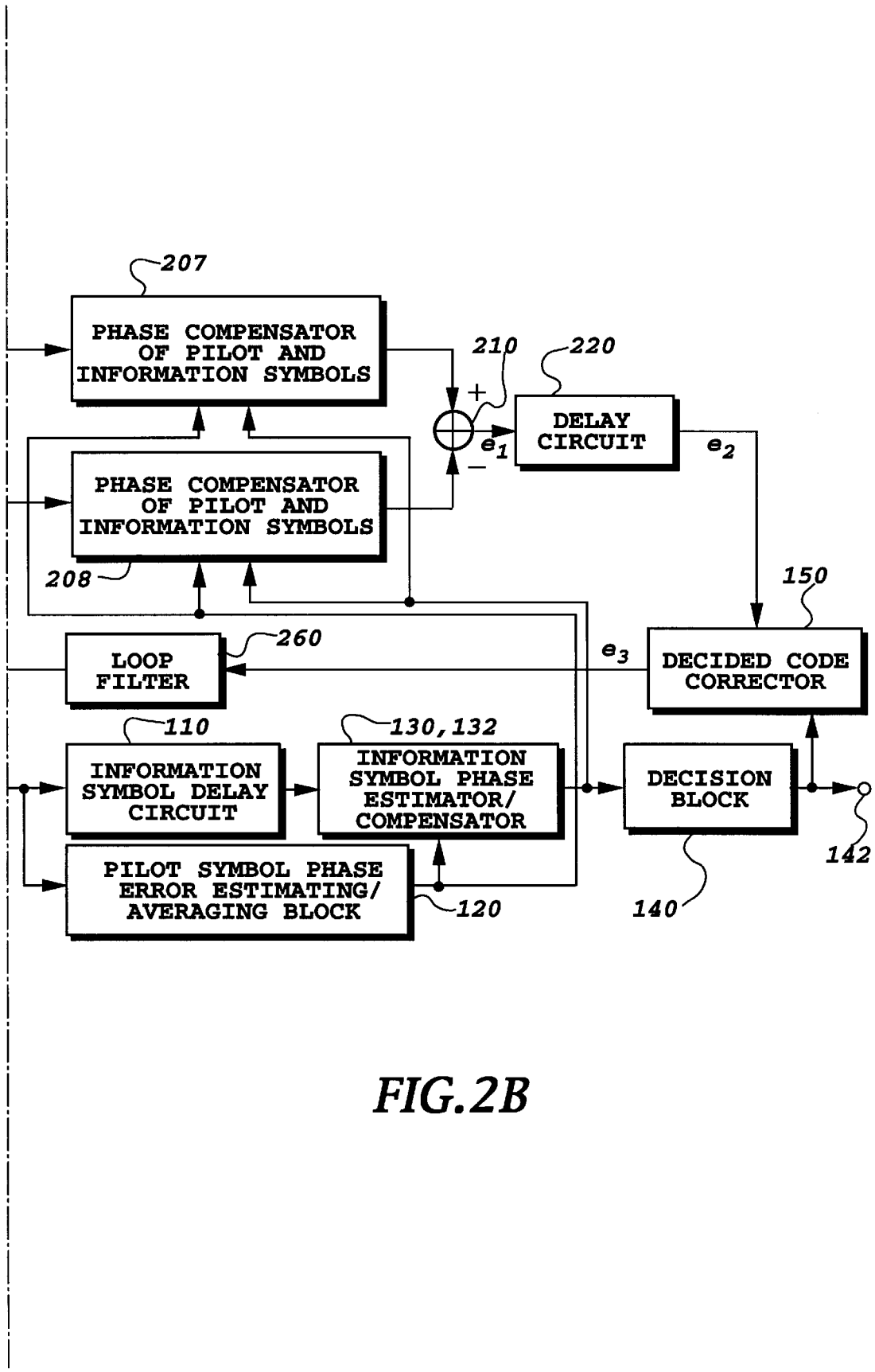
Figures 3, 3A:
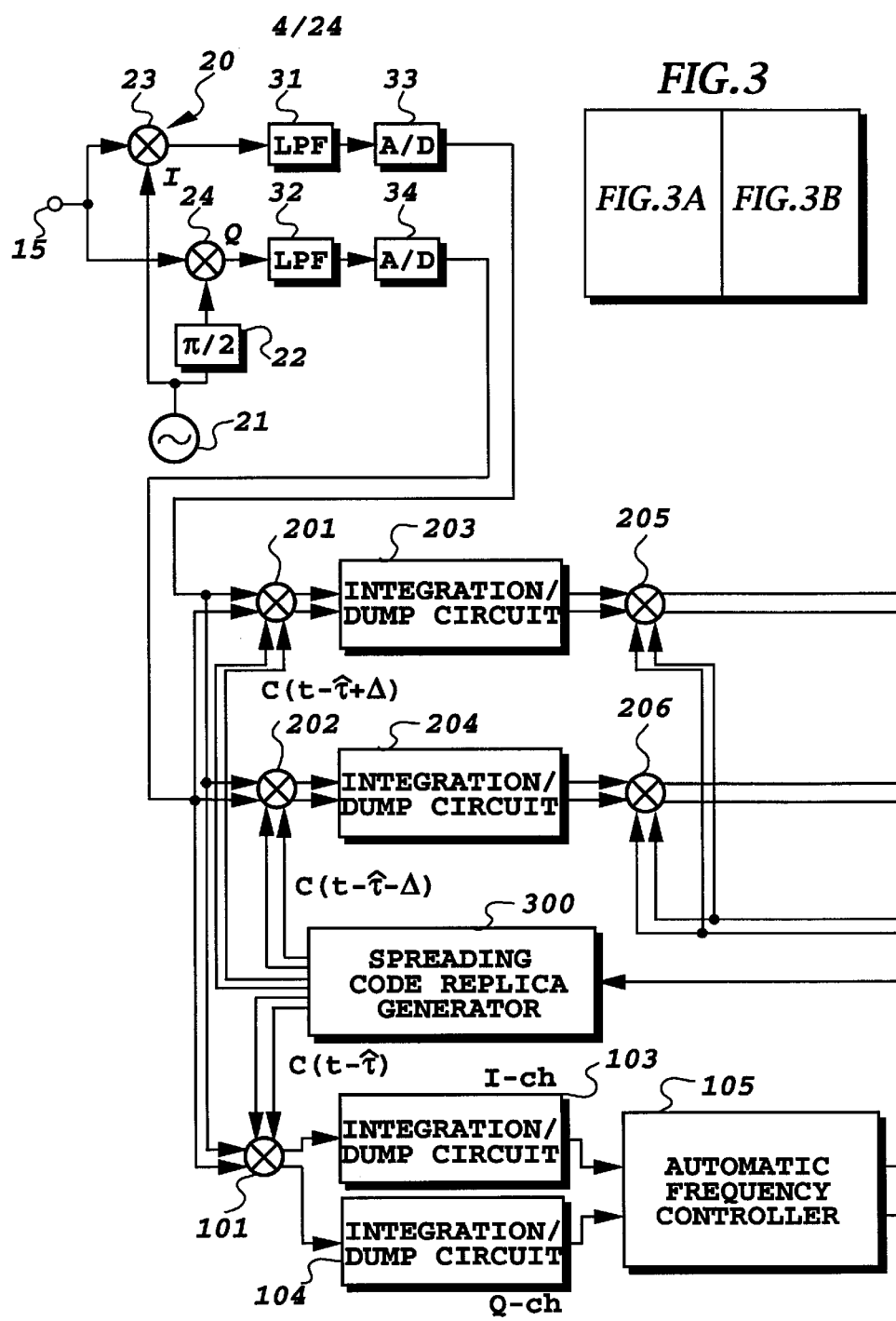
FIG. 3 shows arrangement of FIGS. 3A and 3B.
Figure 3B:
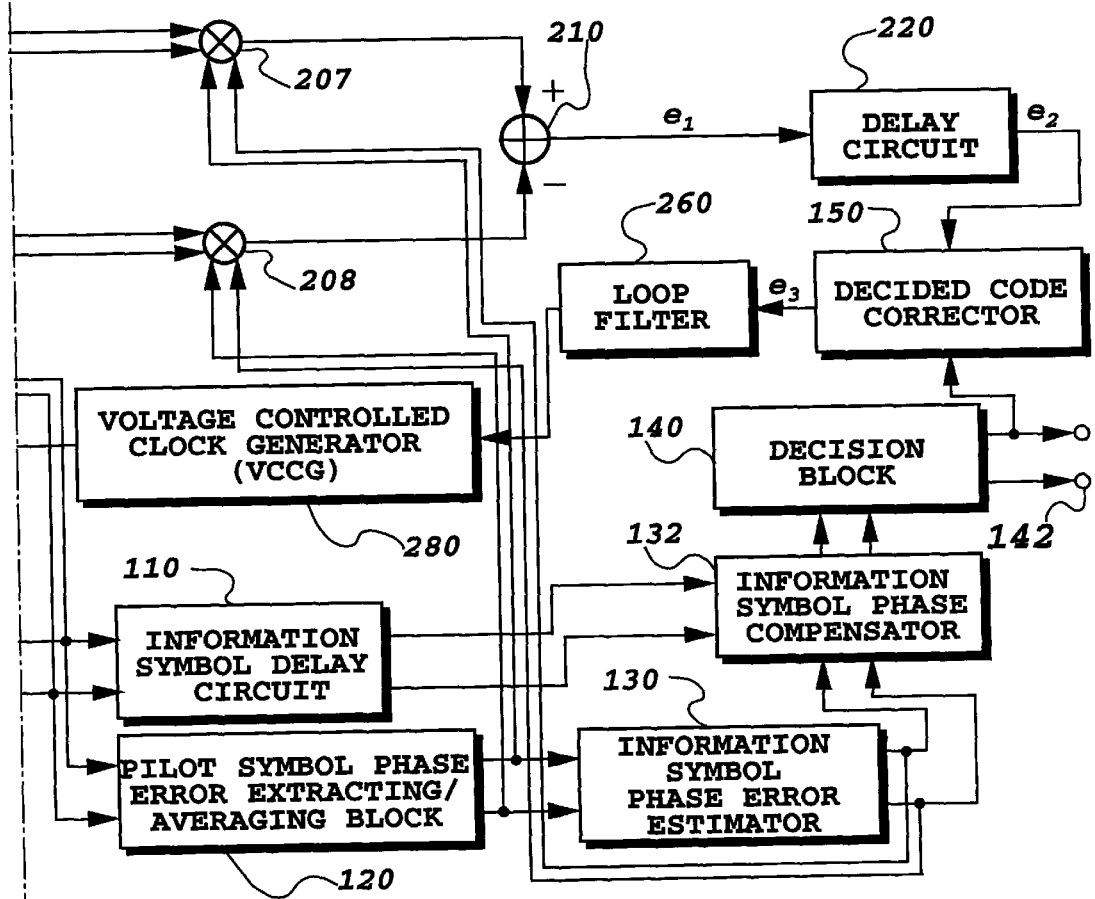

FIGS. 2A and 2B are block diagrams showing a first embodiment of a coherent tracking apparatus for a CDMA receiver in accordance with the present invention. FIGS. 3A and 3B are block diagrams showing the first embodiment in more detail.

In these figures, a received spread signal input to an input terminal 15 is fed to a quasi-coherent detector 20. The quasi-coherent detector 20 comprises a local oscillator 21, a 90 degree phase shifter 22, and two multipliers 23 and 24, and performs quasi-coherent detection of the received spread signal with orthogonal two signals, thereby producing the I and Q components of the spread signal. The I and Q components are passed through LPFs (lowpass filters) 31 and 32, and then converted to digital signals by A/D converters 33 and 34.

The digital spread signal which is A/D converted is fed to a correlator (a complex multiplier) 101 in a demodulation system and correlators (complex multipliers) 201 and 202 in a tracking system.

The correlator 101 complex-multiplies the digital spread signal by a demodulation spreading code replica fed from a spreading code replica generator 300 to detect the correlation between them, thereby despreading the digital spread signal. The despread signal obtained is integrated by integration/dump circuits 103 and 104 for one symbol period, and is fed to an automatic frequency controller (AFC) 105. The AFC 105 eliminates a stationary frequency offset between the transmitter and receiver. The frequency offset arises from the frequency difference between the carrier frequency of the transmitter and the oscillation frequency of the local oscillator 21 of the quasi-coherent detector. The despread signal output from the AFC 105 is fed to an information symbol delay circuit 110 and a pilot symbol phase error extracting/averaging block 120, and undergoes absolute coherent detection through the following stages.

Figure 4:
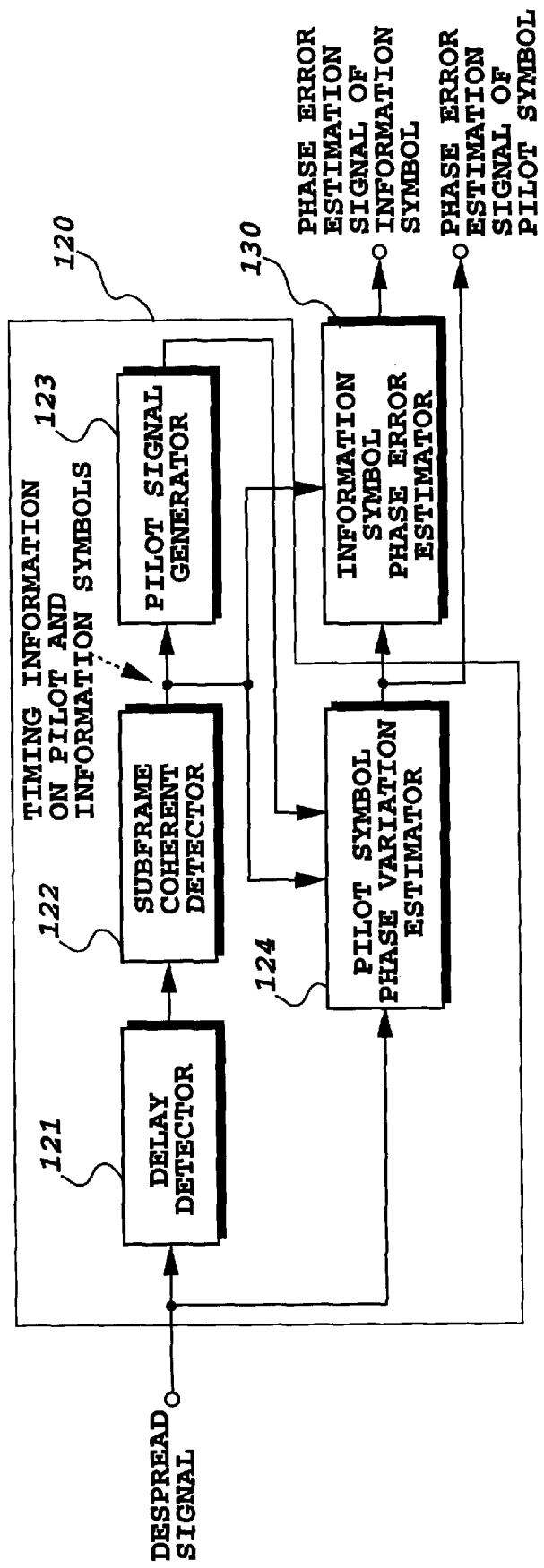
FIG. 4 is a block diagram showing the arrangement of a pilot symbol phase error extracting/averaging block 120.

FIG. 4 is a block diagram showing the pilot symbol phase error extracting/averaging block 120. The despread signal output from the AFC 105 is fed to a delay detector 121 in FIG. 4. The delay detector 121 carries out delay detection by carrying out complex multiplication between the fed signal and a signal obtained by delaying the fed signal by one symbol interval, thereby eliminating the effect of the phase variations due to fading. The detected despread signal is fed to a subframe coherent detector 122. The subframe coherent detector 122 identifies pilot symbols of a known pattern, recovers the clock timing of each symbol, and reproduces subframe timings which are repetition period of the pilot signal, thereby generating a symbol synchronizing signal and a subframe synchronizing signal. The symbol synchronizing signal and the subframe synchronizing signal are fed to a pilot signal generator 123, a pilot symbol phase variation estimator 124 and an information symbol phase error estimator 130. The pilot signal generator 123 generates a reference pilot signal of a known pattern in phase with the subframe synchronizing signal. The subframe coherent detector 122 also supplies the despread signal to the pilot symbol phase variation estimator 124 and the information symbol phase error estimator 130.

The pilot symbol phase variation estimator 124 compares the reference pilot symbols fed from the pilot signal generator 123 with the pilot symbols included in the despread signal to detect the phase error, that is, the phase difference of the pilot symbols from the reference pilot symbols. The fluctuations in the phase error due to the variations of propagation paths can be estimated in real time by performing this operation each time the pilot symbol is received. The estimated phase errors are averaged in a pilot section, and is fed to the information symbol phase error estimator 130. The information symbol phase error estimator 130 interpolates the average phase errors obtained in successive pilot sections, thereby estimating the phase error for each information symbol.

Figure 5:
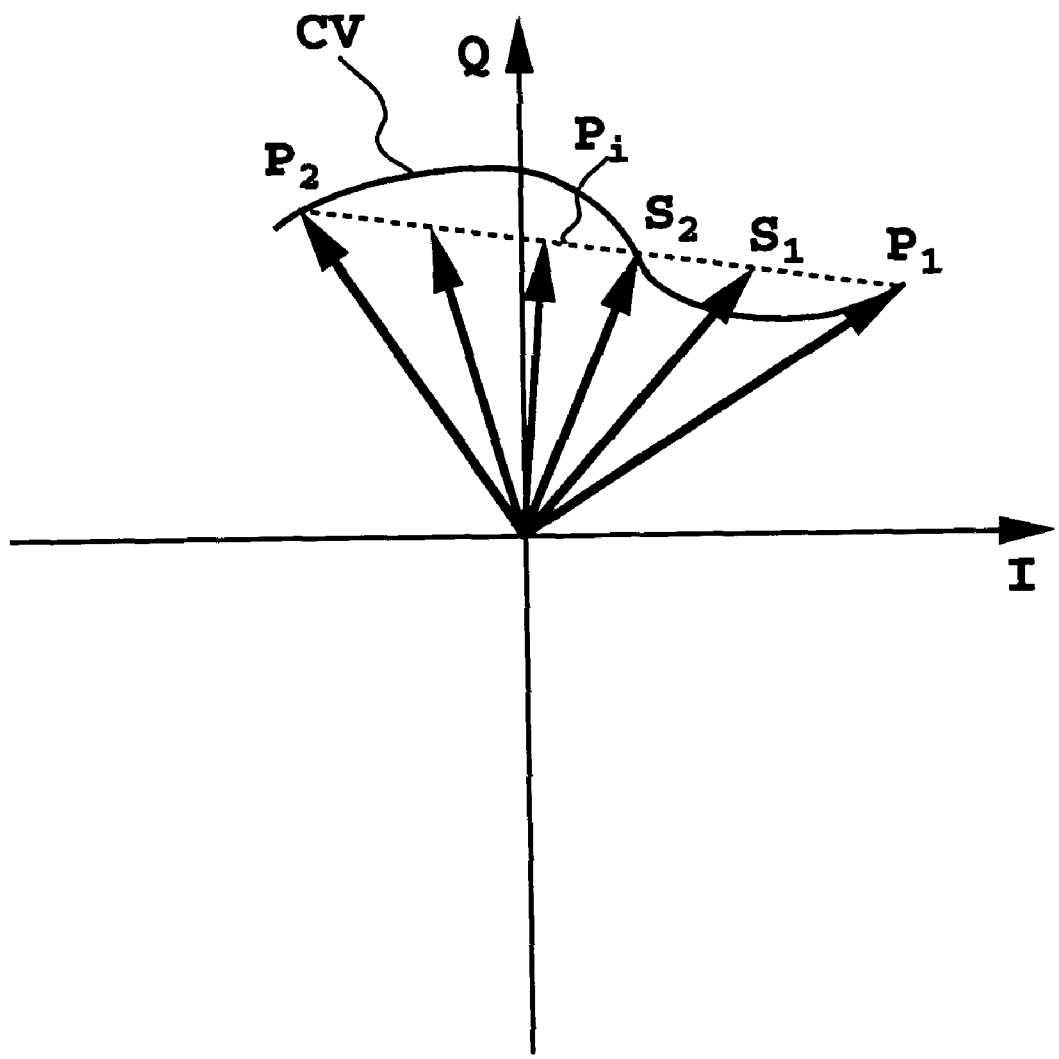
FIG. 5 is a diagram illustrating the interpolation of the pilot signals into an information symbol section.

FIG. 5 illustrates the phase error estimation of the information symbols by the information symbol phase error estimator 130, and the phase error compensation method of the information symbols by an information symbol phase compensator 132. A broken line Pi is obtained by interpolating the average phase vectors $P_1$ and $P_2$ obtained in the two consecutive pilot sections $PS_1$ and $PS_2$ in FIG. 6. Phase vectors $S_1, S_2, \ldots$ of individual information symbols can be obtained from the broken line and the positions of the respective information symbols with respect to the pilot symbols. The curve CV in this figure shows an example of the locus of the end points of actual phase vectors of respective symbols. Although the simplest first order interpolation is shown in FIG. 5, it is possible to apply the second order interpolation or Gaussian interpolation, the detail of which is described in, for example, S. Sampei et al., "Rayleigh Fading Compensation for QAM in Land Mobile Radio Communications", IEEE Transactions on Vehicular Technology, VOL. 42, No. 2, MAY 1993. Thus, the information symbol phase error estimator 130 generates a phase error estimation signal for individual information symbols, and provides them to the information symbol phase compensator 132. The information symbol phase compensator 132 compensates the individual information symbols using the estimated phase errors.

Returning to FIGS. 2A, 2B, 3A and 3B, the information symbols compensated by the information symbol phase compensator 132 are fed to a decision block 140. The decision block 140 performs absolute coherent detection of the individual information symbols, and produces its result from an output terminal 142 as a demodulated output and feeds it to a decided code corrector 150.

Next, the tracking system will be described. The digital despread signal fed to multipliers (correlators) 201 and 202 are multiplied by spreading code replicas fed from the spreading code replica generator 300 to detect the correlations therebetween. In this case, the phases of the replicas fed to the multipliers 201 and 202 differ from that of the spreading code replica of the demodulation system by $+\Delta$ and $-\Delta$, respectively. The magnitude of $\Delta$ is usually set at Tc/2 where Tc is a chip period. The outputs of the multipliers 201 and 202 are fed to integration/dump circuits 203 and 204, which integrate the fed signals to remove high frequency noise components. The arrangement so far is the same as that of the conventional circuit in FIG. 1.

The outputs of the integration/dump circuits 203 and 204 are multiplied by the output of AFC 105 by multipliers 205 and 206. This is for correcting the frequency drift included in the integration/dump circuit, thereby removing the residual carrier components. The output of the multipliers 205 and 206 are fed to multipliers 207 and 208, each of which functions as a phase compensator of the pilot and information symbols that compensates for the phase errors of the pilot and information symbols caused by fading. Specifically, the multipliers 207 and 208 multiply the outputs of the multipliers 205 and 206 by the phase error estimation signal of the pilot symbols output from the pilot symbol phase error extracting/averaging block 120, thereby carrying out the phase error compensation of the pilot and information symbols due to fading.

Only the I (or Q) components of the phase compensated signals are fed to an adder 210, and are added in opposite phases. This provides S-curve phase error detection characteristics needed for the tracking. The present invention is characterized in that it uses only one of the I and Q components, which differs from the conventional tracking apparatus taking the square sum of both the I and Q components by the square-law detection. The phase error signal $e_1$ output from the adder 210 is delayed by one subframe (=one pilot period) $T_B$ by a delay circuit 220 to be output as a phase error signal $e_2$. The delay corresponds to the delay time of the information symbol delay circuit 110.

The phase error signal $e_2$ thus obtained still includes the modulated components of the information data. The decided code corrector 150 is a circuit for removing these components. It multiplies the phase error signal $e_2$ by the complex conjugate of the decided data output from the decision block 140 to eliminate the modulated components of the information data contained in the phase error signal $e_2$. In this specification, this process is referred to as reverse modulation of the modulated components of the information data by the decided data.

Figure 6:
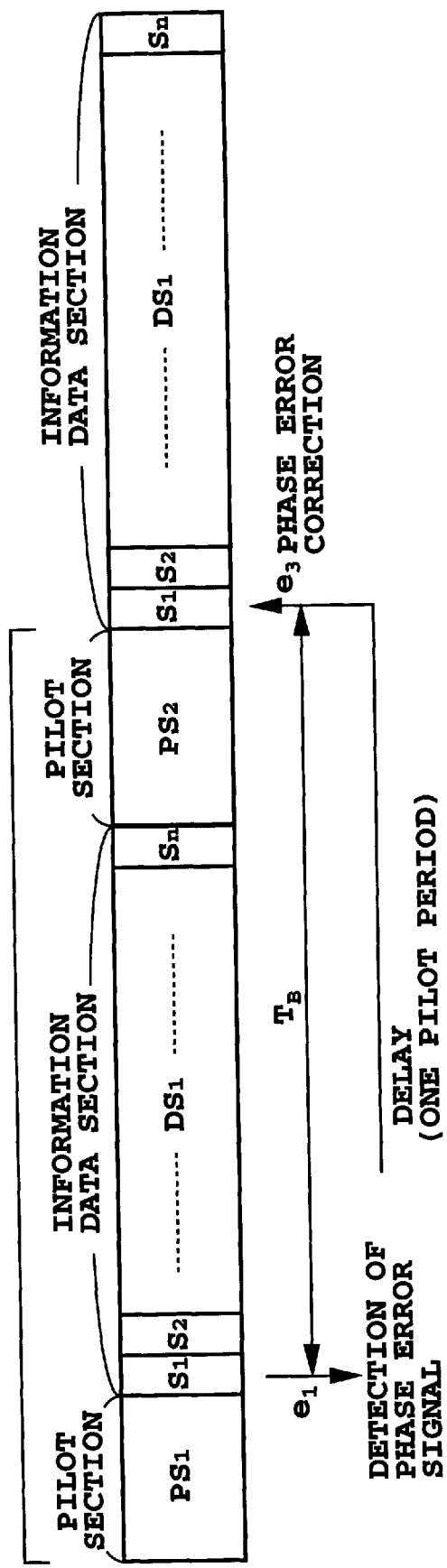
FIG. 6 is a schematic diagram illustrating the tracking timings of the embodiment.

FIG. 6 is a diagram illustrating the timings for generating the phase error signals for tracking. The phase error signal $e_1$ output from the adder 210 is delayed by one pilot period $T_B$ by the delay circuit 220, and is fed to the decided code corrector 150 as the phase error signal $e_2$. The decided code corrector 150 multiplies the phase error signal $e_2$ by the decided output to remove the modulated component of the information data contained in the signal $e_2$, thereby outputting the phase error signal $e_3$. The phase error signal $e_3$ is fed to a loop filter 260. The loop filter 260 averages the phase error signal $e_3$ over several symbols to eliminate the effect of noise, and provides the output to a voltage controlled clock generator 280. The VCCG 280 controls its oscillation phase in accordance with the phase error signal, thereby controlling the phase of the spreading code replica produced from the spreading code replica generator 300. Incidentally, a spreading code replica generator 305 in FIG. 2A corresponds to the VCCG 280 and the spreading code replica generator 300 of FIGS. 3A and 3B.

Thus, the phase error correction of the spreading code replica is carried out on the basis of the phase error signal el which was detected one pilot period before. This is because the information data is delayed by one pilot period $T_B$ to compensate the phase of the information data symbols by interpolating the pair of pilot signals sandwiching the information data symbols.

Figure 7:
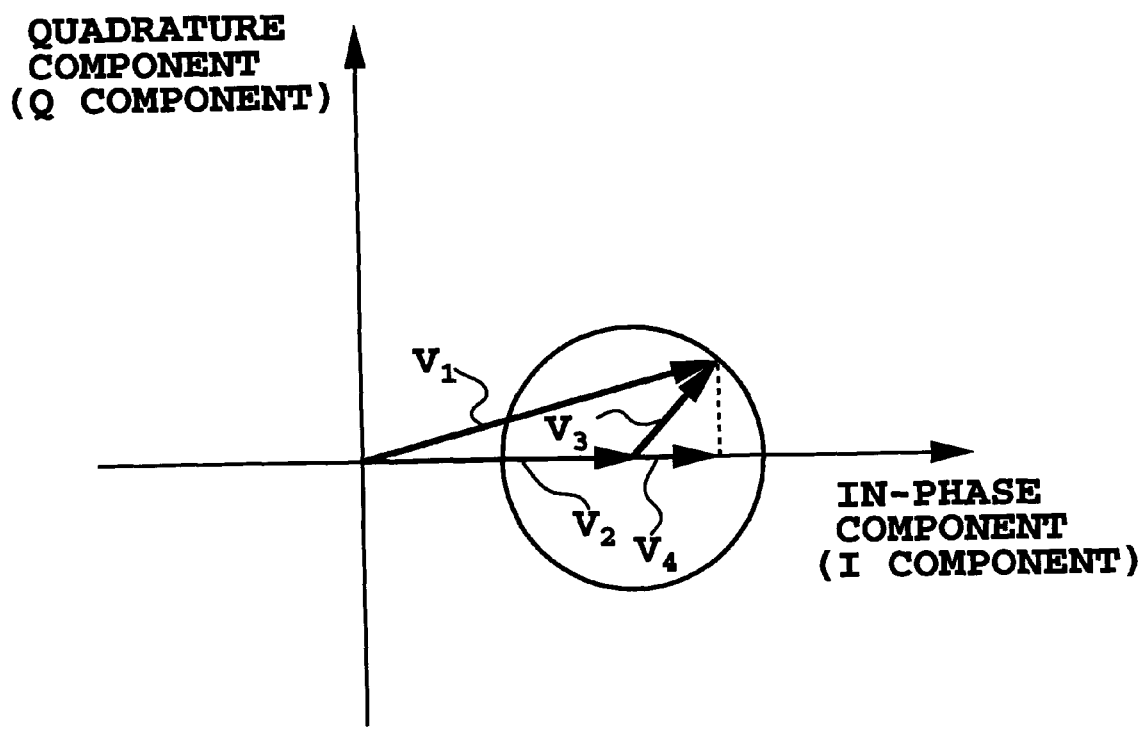
FIG. 7 is a vector diagram illustrating the principle of reducing noise by the coherent tracking in accordance with the present invention.

FIG. 7 is a vector diagram illustrating the reason why the noise power included in the phase error signal can be reduced in the tracking apparatus in accordance with the present invention. In this figure, the received signal vector $V_1$ is represented as the sum of the transmitted signal vector $V_2$ and the noise component vector $V_3$. Since the conventional tracking apparatus as shown in FIG. 1 employs the square-law detection to remove the modulated components of the information data from the phase error signal, the noise component vector $V_3$ is squared, thereby resulting in an increase in the noise component vector.

In contrast with this, since the present invention does not employ the square-law detection, but uses only the I component (or Q component) of the correlation signal, that is, vector $V_4$ to eliminate the modulated components of the information data, the noise level can be reduced by 3 dB in average.

Figure 1:
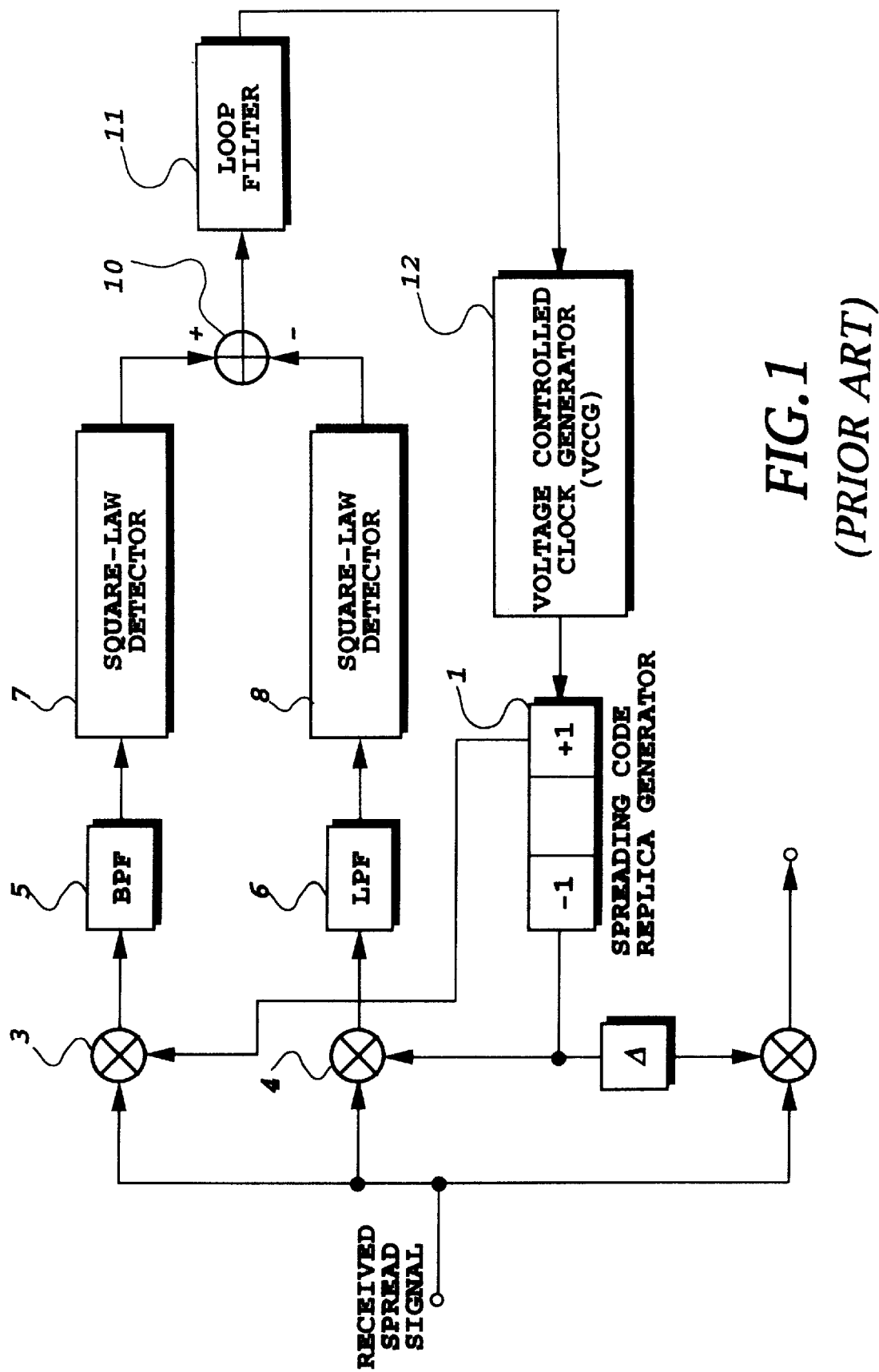
FIG. 1 is a block diagram showing a conventional DLL (Delay Locked Loop)
Figure 8A:
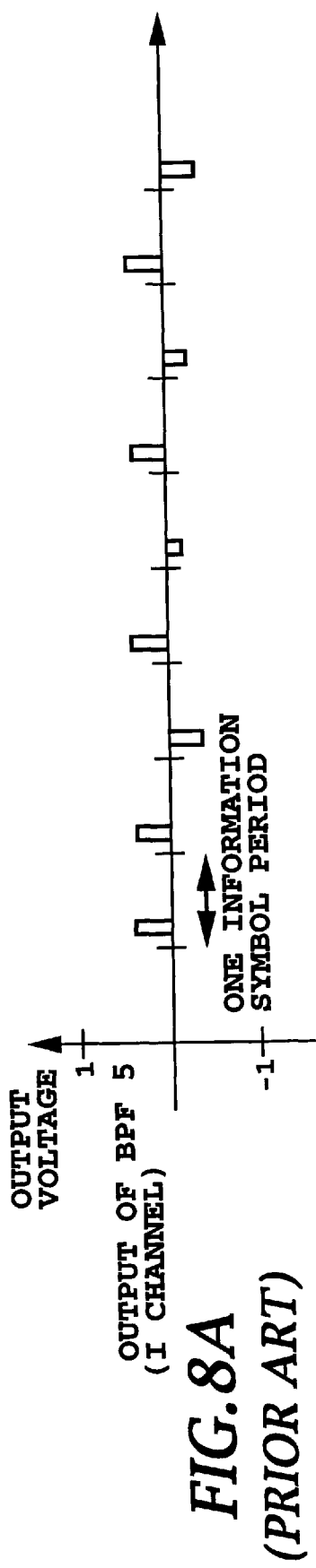
Figure 8B:
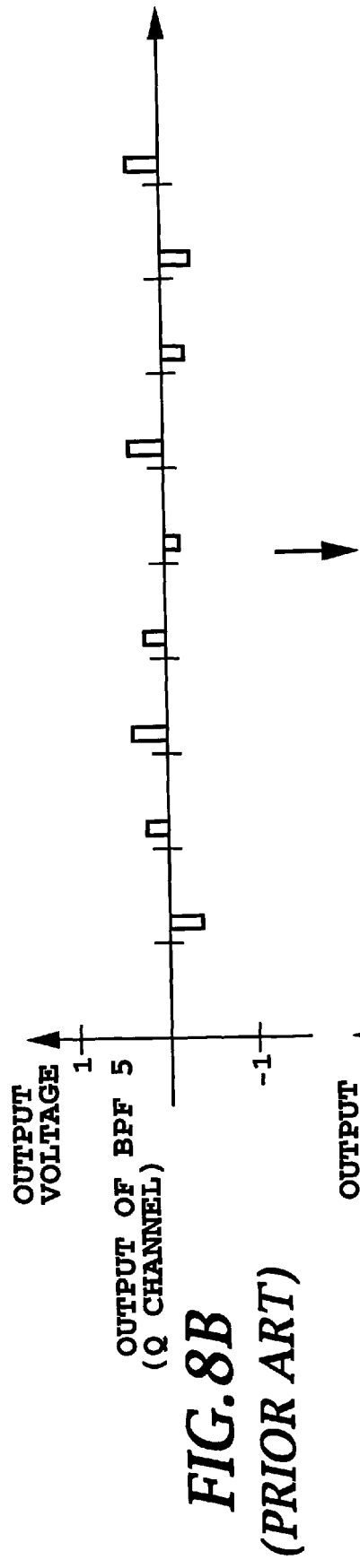
Figure 8C:
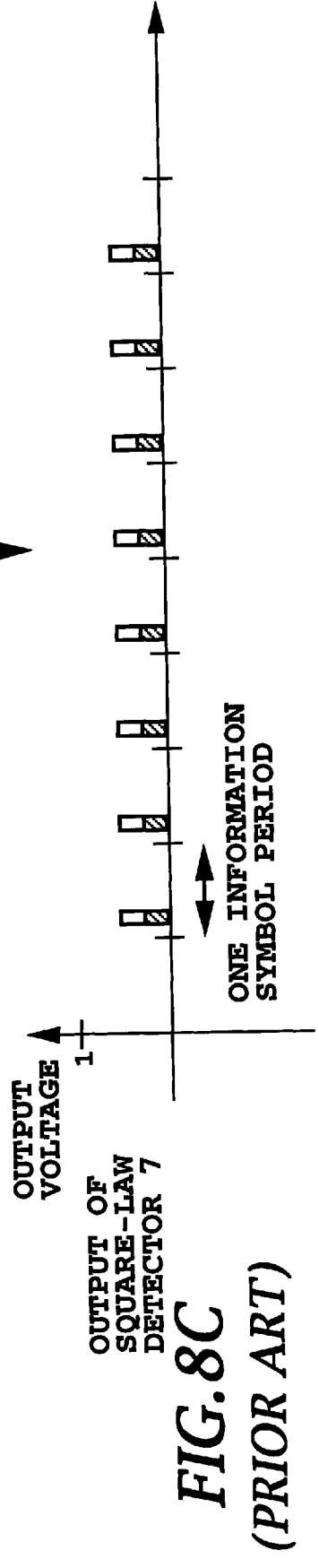
Figure 9A:
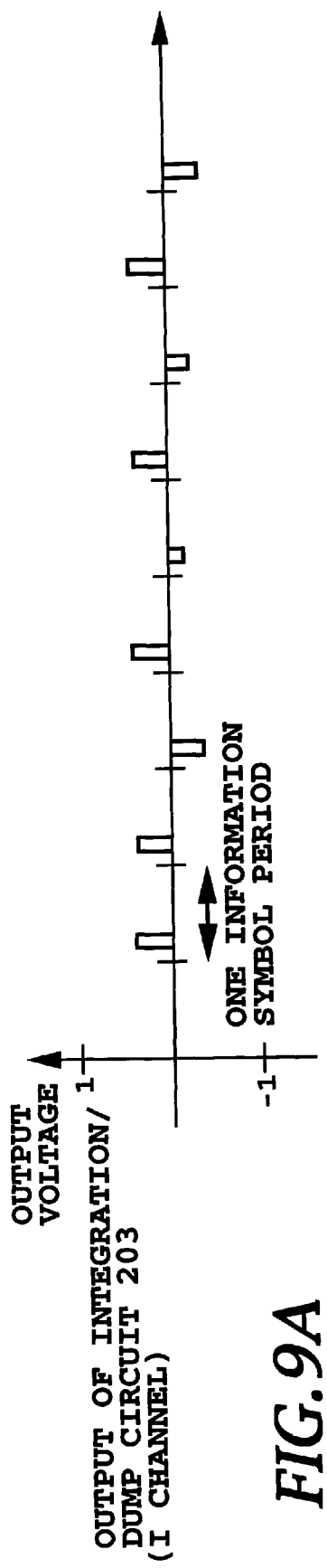
Figure 9B:
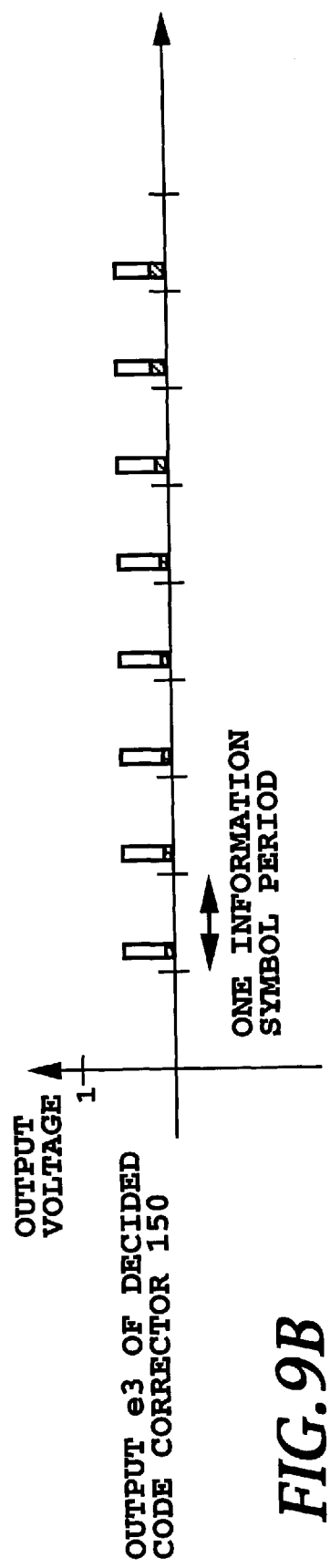

FIGS. 8A–8C are diagrams illustrating the generating process and noise of the phase error signal in the conventional tracking apparatus as shown in FIG. 1. FIGS. 9A and 9B are diagrams illustrating the generating process and noise of the phase error signal in the tracking apparatus in accordance with the present invention.

FIGS. 8A and 8B are waveform charts illustrating the outputs of the I and Q channels of the BPF 5 of FIG. 1, and FIG. 8C is a waveform chart illustrating the output of the square-law detector 7. The BPF 5 outputs the I- and Q-channel correlation signals for each symbol period. The square-law detector 7 outputs the square sum of these correlation signals as shown in FIG. 8C. The noise components associated with these signals are shown by shaded portions in FIG. 8C. A similar waveform is output from the square-law detector 8, and the adder 10 obtains the difference between the outputs of the square-law detectors 7 and 8. Accordingly, although the noise components are reduced because they are subtracted, their square difference remains.

On the other hand, FIGS. 9A and 9B illustrate the waveforms of the tracking apparatus in accordance with the present invention. FIG. 9A illustrates the I-channel output of the integration/dump circuit 203, and FIG. 9B illustrates the output $e_3$ of the decided code corrector 150. The residual noise contained in the phase error signal $e_3$ is shown by the shaded portions in FIG. 9B. The residual noise components are simple differences between the noise components included in the I components output from the multipliers 207 and 208. Accordingly, they are smaller than the conventional square differences. Thus, the noise is reduced, and high accuracy tracking is achieved, which is the effect of the present invention.

EMBODIMENT 2

Figure 10A:
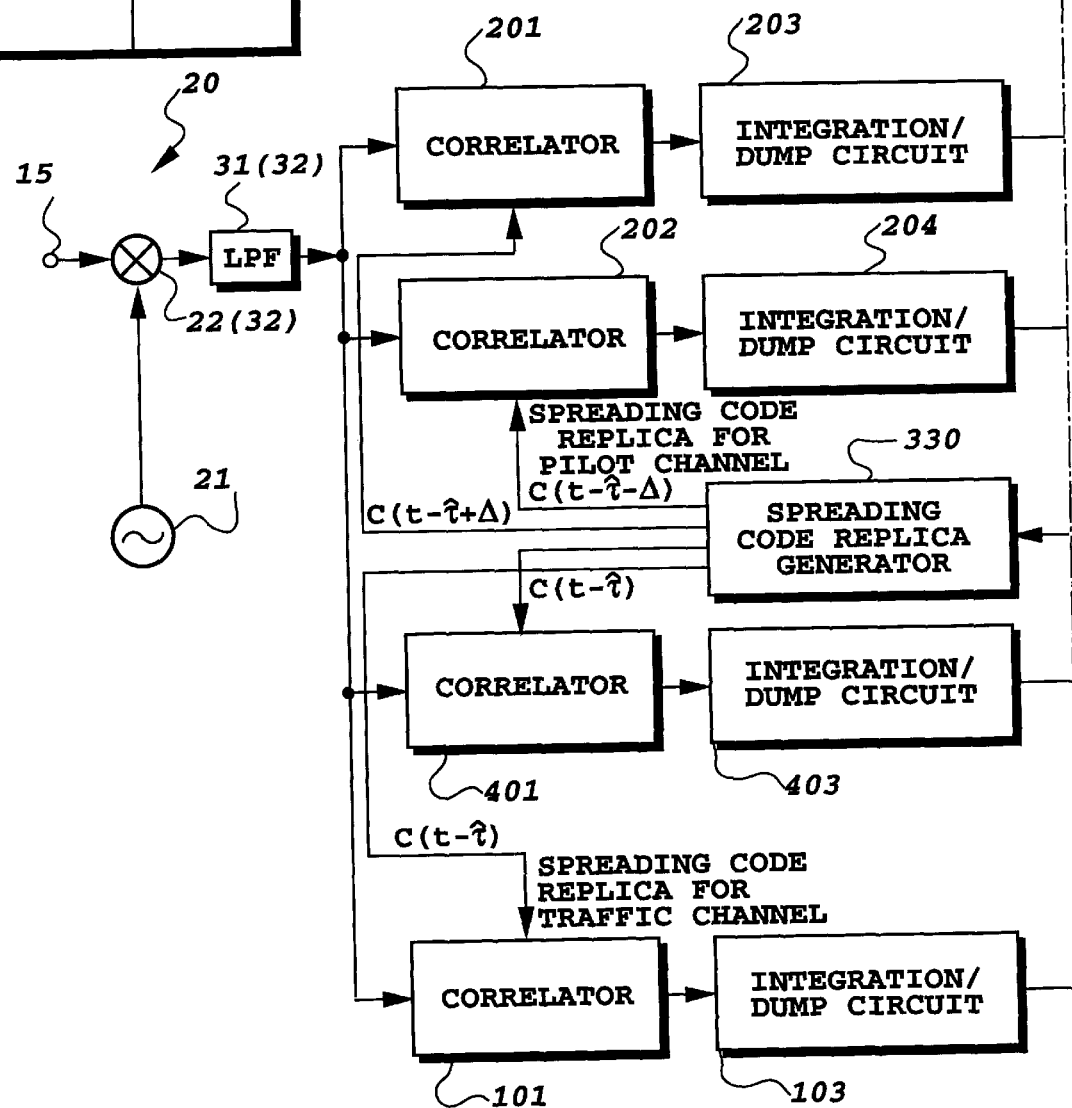
Figure 10B:
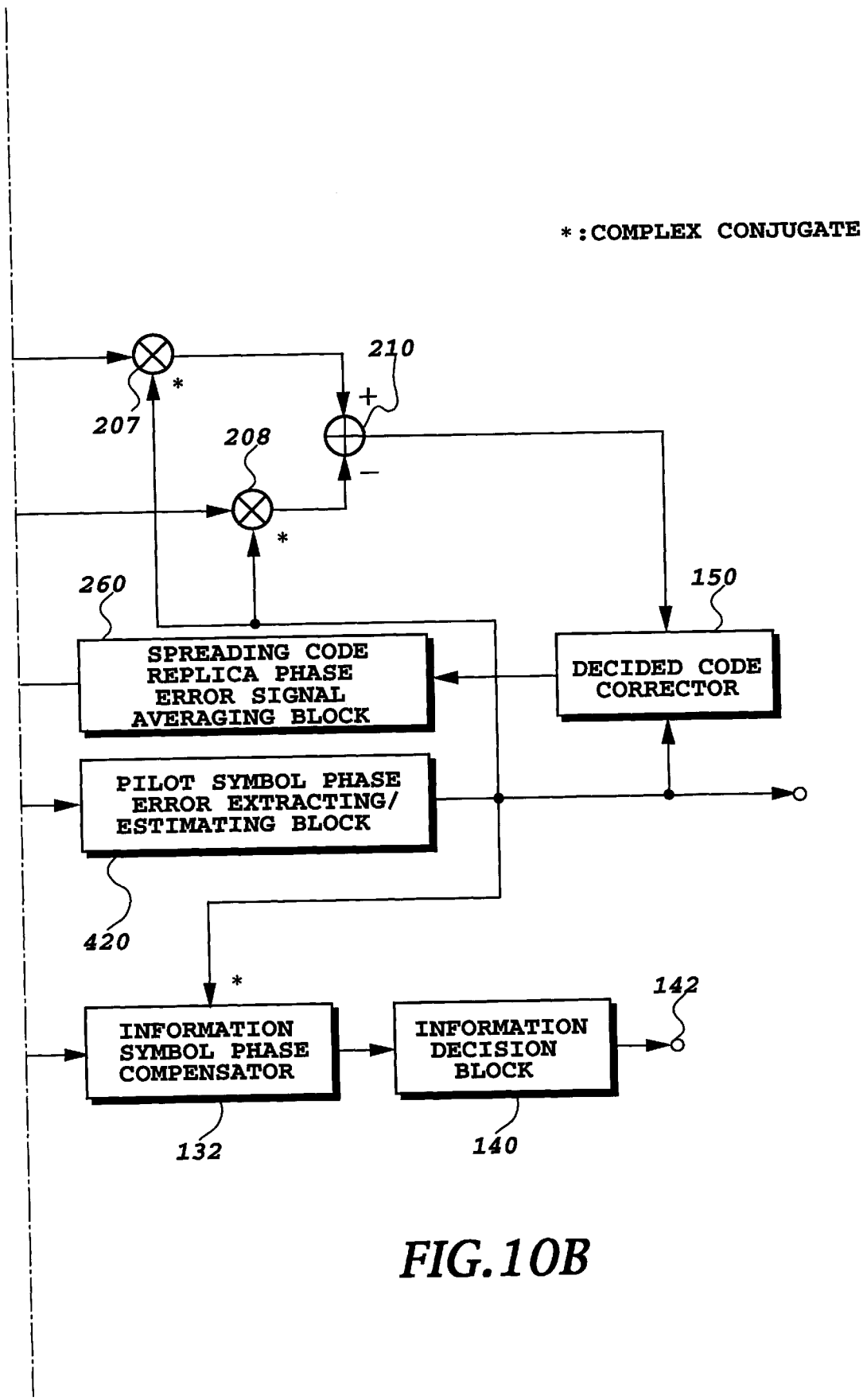
Figure 11B:
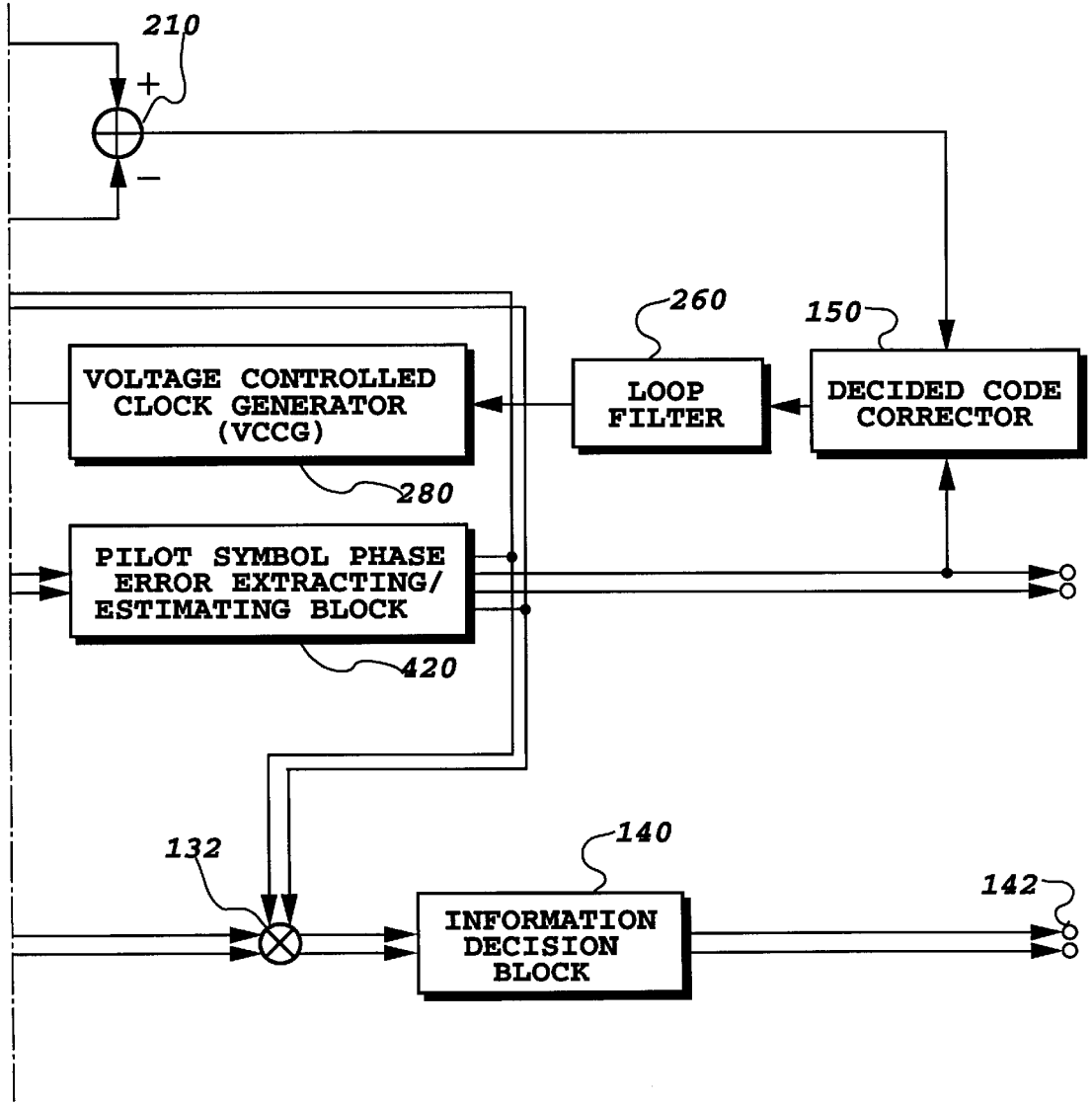

FIGS. 10A and 10B are block diagrams showing a second embodiment of the coherent tracking apparatus for the CDMA receiver in accordance with the present invention, and FIGS. 11A and 11B are block diagrams showing the detail of the same embodiment.

The following is main differences of the present embodiment from the first embodiment as shown in FIGS. 2A and 2B, and FIGS. 3A and 3B.

(1) Although the channels are prerequisite in which pilot signals are inserted at intervals into the information data in the first embodiment, a system is prerequisite which comprises a dedicated channel for continually transmitting pilot signals in the second embodiment so that the pilot signals are transmitted through the dedicated pilot channel and the information data are transmitted through traffic channels. In this case, the pilot signals and the information data are spread and transmitted using different spreading codes.

Figure 12:
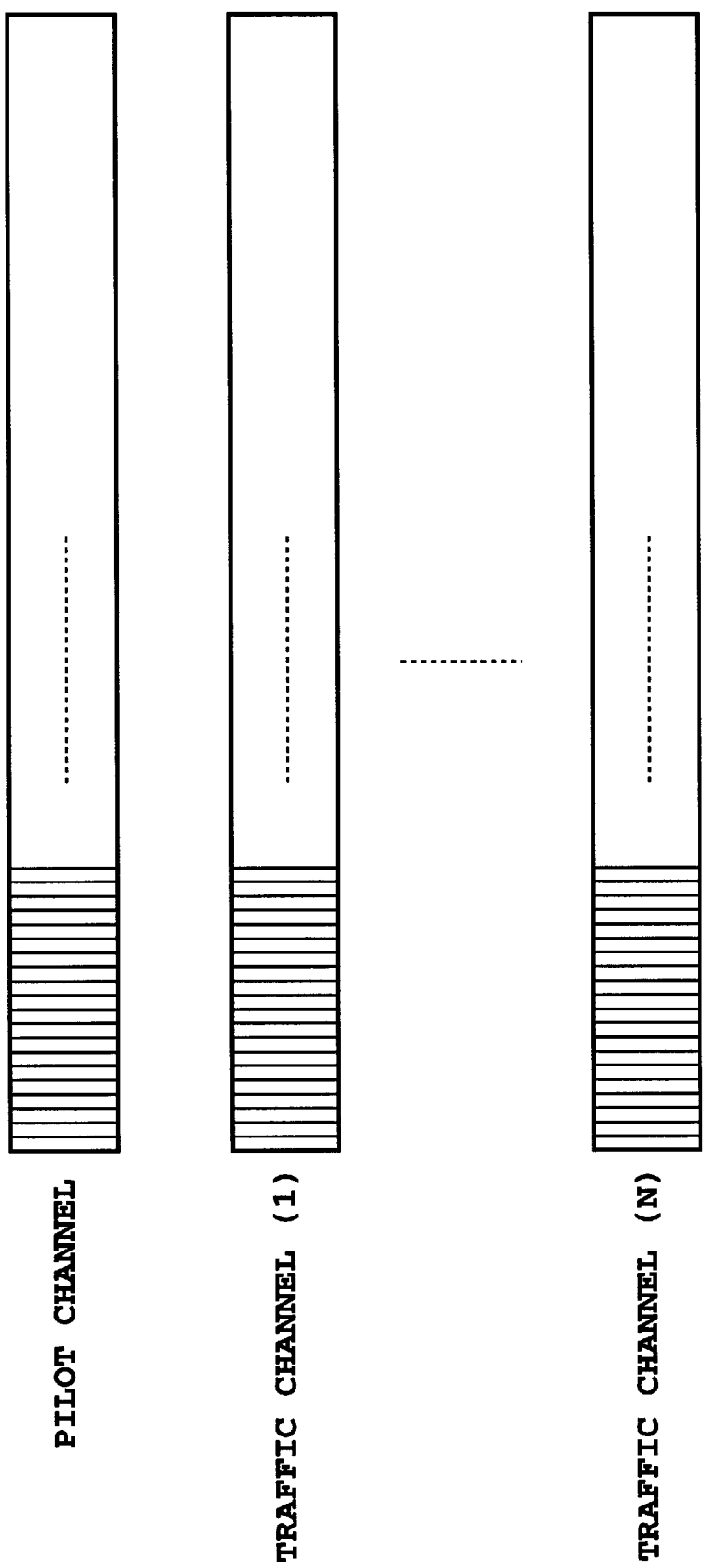
FIG. 12 is a diagram showing a channel arrangement in the second embodiment.

FIG. 12 illustrates a channel configuration of such a system. A common pilot channel is provided for N traffic channels. Each traffic channel can continually transmit information data, and the phase of the information data is compensated by the estimated phase obtained from the common pilot channel.

(2) Since the dedicated pilot channel is provided in the second embodiment, a despreader dedicated for the pilot signal is provided in the receiver in connection with the pilot channel.

The despreader comprises a correlator 401 and an integration/dump circuit 403 in FIG. 10A and FIG. 11A. The despread signal of the pilot signal output from the integration/dump circuit 403 is fed to a pilot symbol phase error extracting/estimating block 420, which estimates the phase error of the pilot signal.

(3) A pilot channel spreading code replica generator 310 for the pilot channel and a traffic channel spreading code replica generator 320 for traffic channels are provided. This corresponds to the fact that the pilot signal and the information data are spread by different spreading codes to be transmitted. The spreading code replica generators 310 and 320 in FIG. 11A are incorporated into a spreading code replica generator 330 in FIG. 10A.

(4) Since the phase error signal is continually obtained from the pilot signal, it is not necessary for the phase error signal obtained from the pilot signal to be interpolated into the information data section. The phase error signal associated with each pilot symbol is used as the phase error compensation signal of the coincident information data. Accordingly, the information symbol delay circuit 110 and the information symbol phase error estimator 130 become unnecessary.

(5) Since the pilot signal is continually transmitted, compensators 207 and 208 of phase variations due to fading does not require the phase error signal of the information symbols in this embodiment, which differs from the phase compensators 207 and 208 of the pilot and information symbols as shown in FIG. 2B. The phase variations due to fading can be continually compensated using only the phase error signal of the pilot symbols.

(6) Accompanying the obviation of the information symbol delay circuit 110, the delay circuit 220 of the first embodiment is also eliminated.

(7) The decided code corrector 150 is provided not with the data of the decision block 140, but with the I-component of each symbol of a reference pilot signal which is generated by the pilot signal generator 123 in FIG. 4, and is fed through the pilot symbol phase error extracting/estimating block 420. Thus, the phase error signal output from the adder 210 undergoes code correction by the reference pilot symbols. In other words, the tracking system of the embodiment carries out tracking using the pilot signal.

(8) The pilot symbol phase error extracting/estimating block 420 of the present embodiment does not necessitate the subframe coherent detector 122 which is required by the pilot symbol phase error extracting/averaging block 120 of the first embodiment. This is because the identification is not necessary of the position of the pilot signal inserted into the information data since the pilot signal is transmitted without interruption.

According to such an arrangement, besides the advantages of the first embodiment, an advantage is gained that the information data is immediately compensated by the phase error signal of the corresponding pilot symbols without tedious processings such as interpolation or delay, thereby achieving the absolute coherent detection of the compensated information data, since the phase error signal is continually obtained from the pilot symbols.

EMBODIMENT 3

Figures 13, 13A:
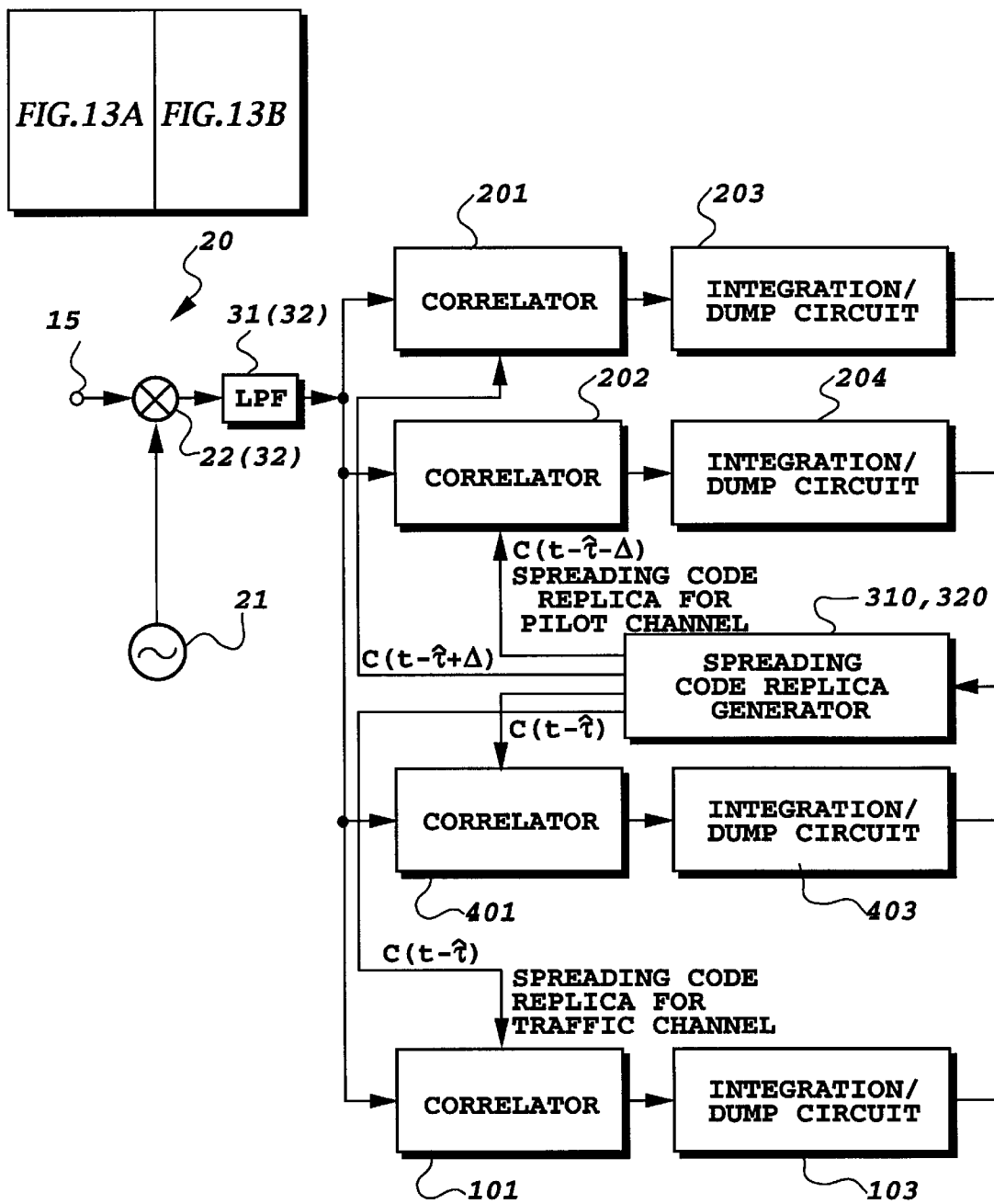
FIG. 13 shows arrangement of FIGS. 13A and 13B.
FIGS. 13A and 13B are block diagrams showing a third embodiment of the coherent tracking apparatus for the CDMA receiver in accordance with the present invention.
Figure 13B:
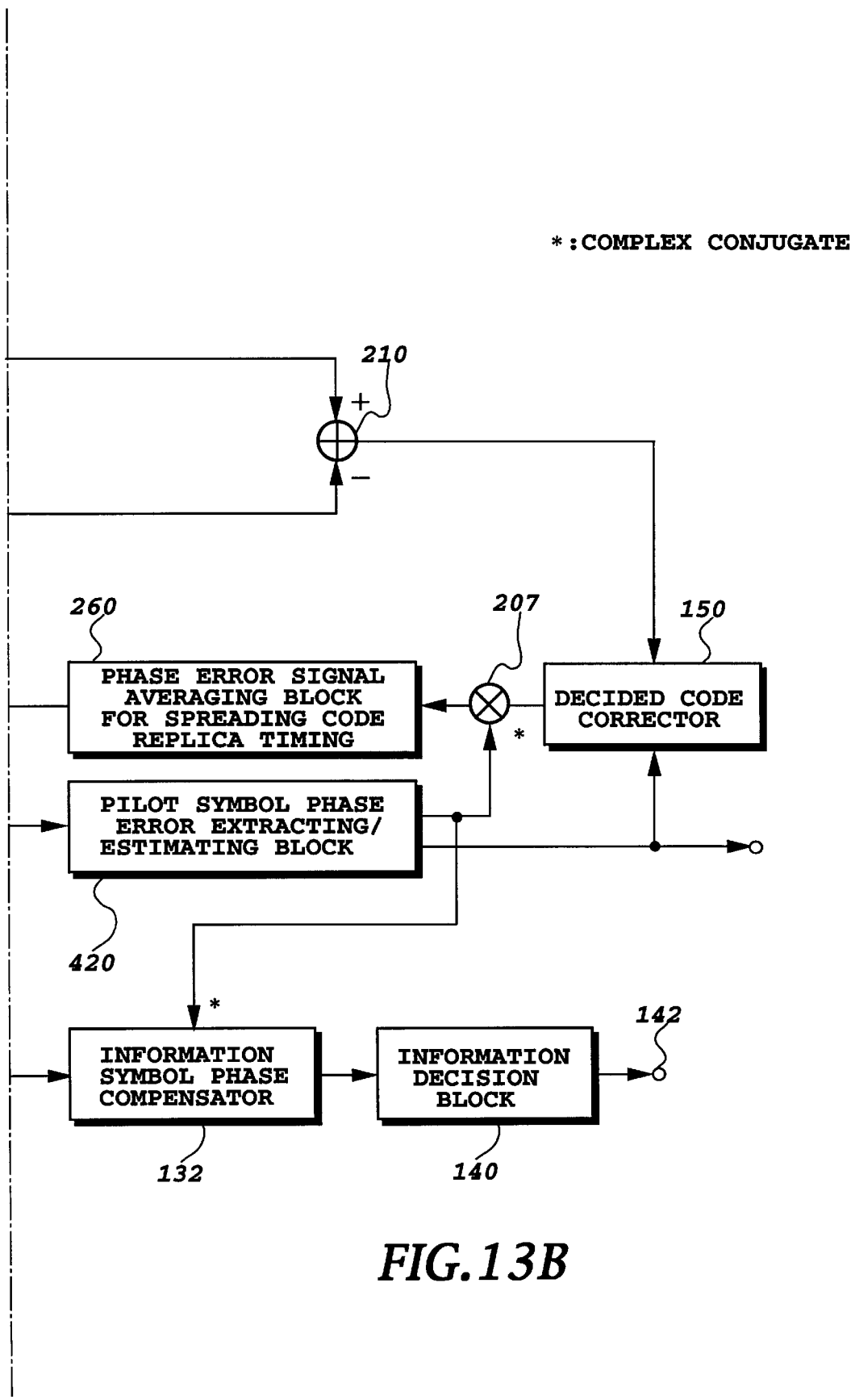

FIG. 13A and 13B are block diagrams showing a third embodiment of the coherent tracking apparatus for the CDMA receiver in accordance with the present invention. This embodiment differs from the second embodiment as shown in FIGS. 10A and 10B in that the compensator 207 of phase variations due to fading is connected to the output of the decided code corrector 150. Although this reverses the order of the compensation of the phase variations due to the fading and the removal of the modulated components of the pilot signal as that of the second embodiment, it can achieve the effect and advantage similar to those of the second embodiment.

EMBODIMENT 4

Figures 14, 14A:
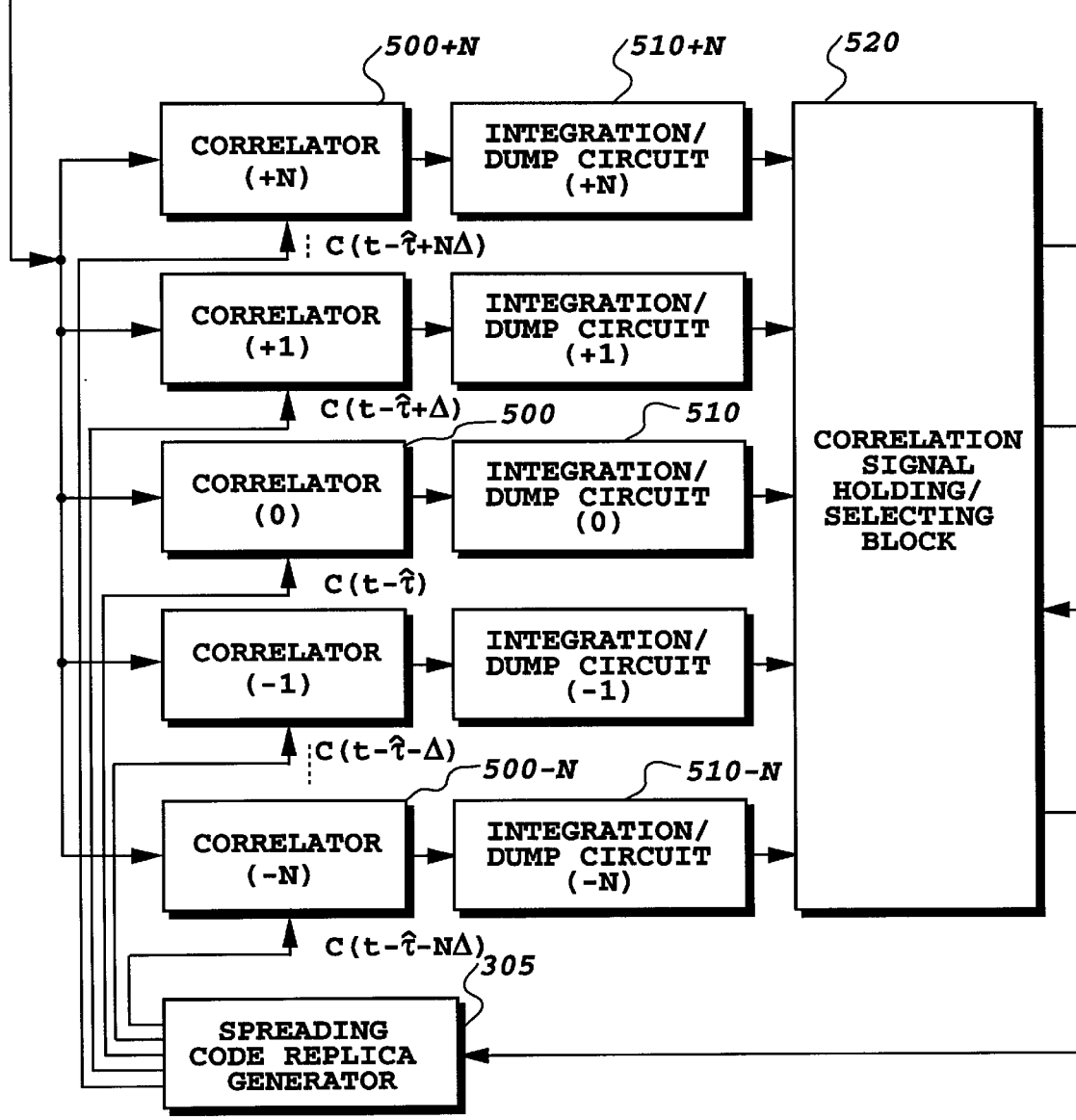
FIG. 14 shows arrangement of FIGS. 14A and 14B.
FIGS. 14A and 14B are block diagrams showing a fourth embodiment of the coherent tracking apparatus for the CDMA receiver in accordance with the present invention.
Figure 14B:
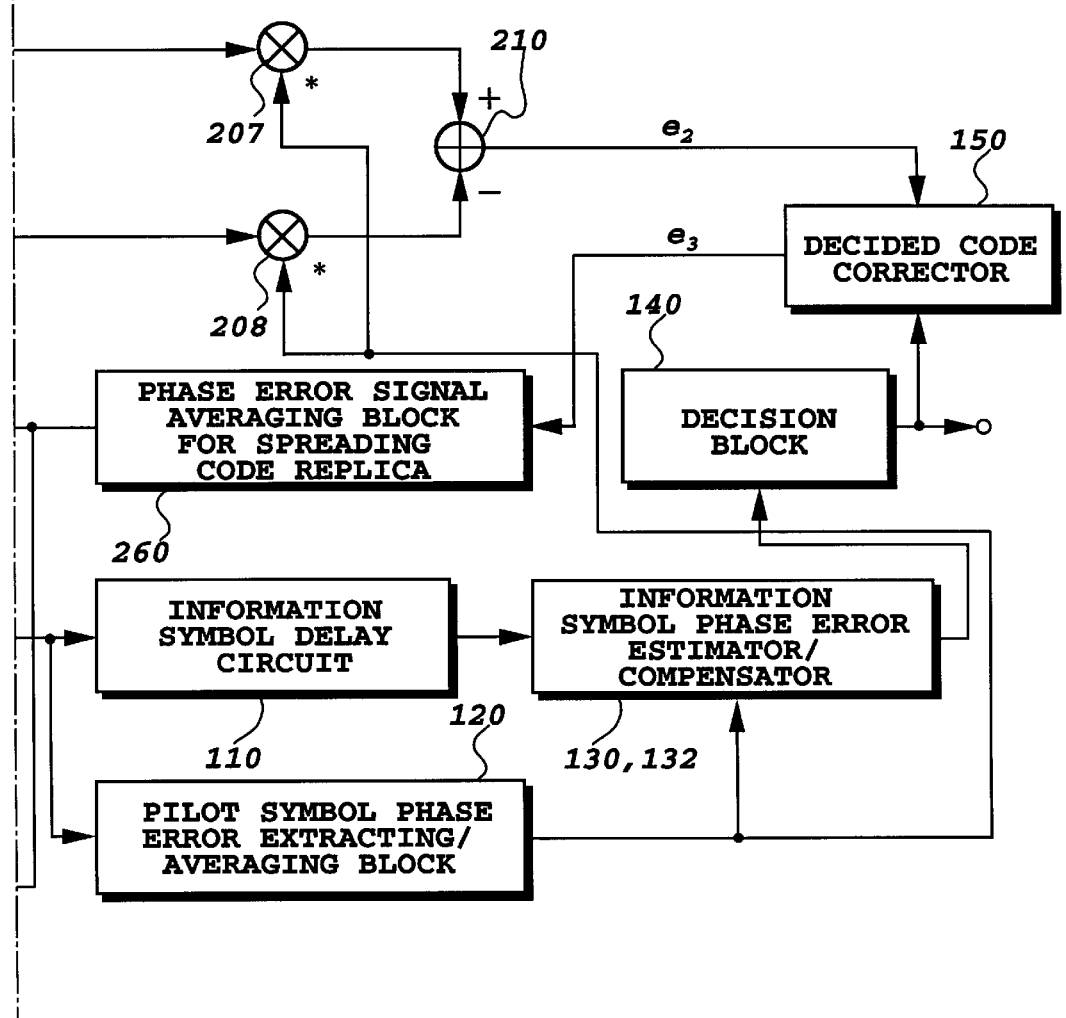

FIGS. 14A and 14B are block diagrams showing a fourth embodiment of the coherent tracking apparatus for the CDMA receiver in accordance with the present invention. This embodiment, which enlarges the capture range of the tracking system, differs from the first embodiment mainly in the following:

(1) This embodiment is provided with (2N+1) correlators 500 k where k=−N−+N, and corresponding (2N+1) integrators 510 k for integrating the outputs of the correlators 500 k, respectively.

(2) In accordance with this, the spreading code replica generator 305 generates (2N+1) spreading code replicas with their phases each shifted by Δ, and feeds them to the correlators 500 k. Here, Δ is usually set at Tc/2, where Tc is the chip period.

(3) A correlation signal holding/selecting block 520 is newly provided, to which the outputs of the entire integration/dump circuits 510 k are fed. The correlation signal holding/selecting block 520 compares the respective outputs of the integration/dump circuits 510 k with a predetermined reference, selects a despread signal despread by a demodulation spreading code replica inphase with the spreading code in the received signal, and supplies the selected one to the information symbol delay circuit 110 and the pilot symbol phase error extracting/averaging block 120. Furthermore, it selects correlations between the received signal and a pair of spreading code replicas for tracking, and supplies them to the multipliers 207 and 208. The outputs of the correlation signal holding/selecting block 520 is performed for each symbol. In this case, the outputs to the multipliers 207 and 208 are provided with a delay of one pilot period TB. Accordingly, the delay circuit 220 of FIGS. 2A and 2B become unnecessary.

(4) A phase error signal averaging block 260 of spreading code replica controls the phase of the spreading code replica to be advanced or retarded by $\Delta$ on the basis of the phase error signal $e_3$ fed from the decided code corrector 150. More specifically, taking account of (Np+Ns) phase error signals $e_3$ fed during the pilot period $T_B$ where Np is the number of the pilot symbols and Ns is the number of the information data symbols, if the number of the phase error signals $e_3$ showing phase advance is equal to or greater than a reference number determined in advance, the phase of the spreading code replica is advanced by $\Delta$, whereas the number of the phase error signals $e_3$ showing phase retardation is equal to or greater than the reference number, the phase of the spreading code replica is lagged by $\Delta$.

Figure 15:
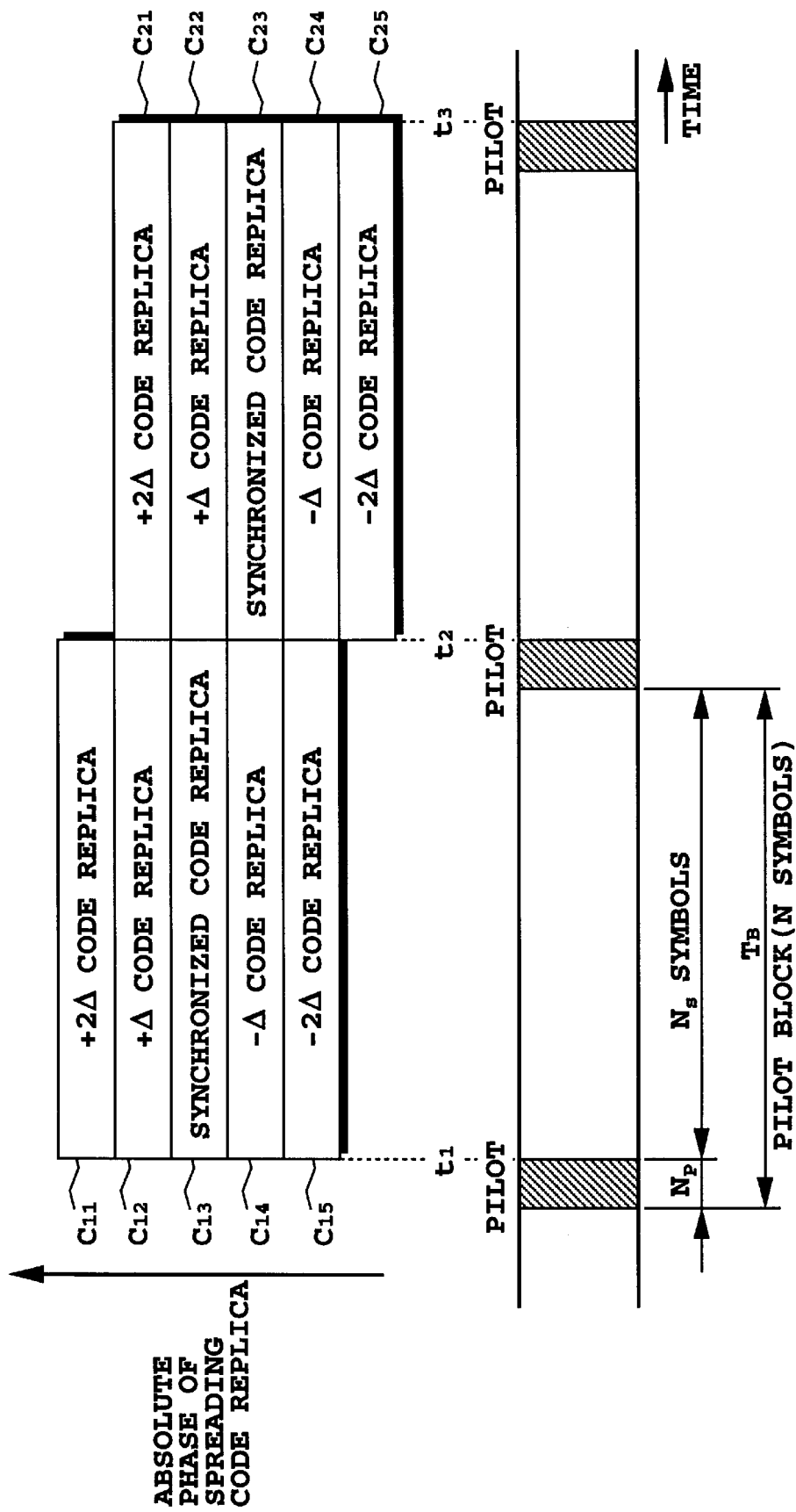
FIG. 15 is a diagram illustrating a fixed averaging method in the fourth embodiment.
Figure 16:
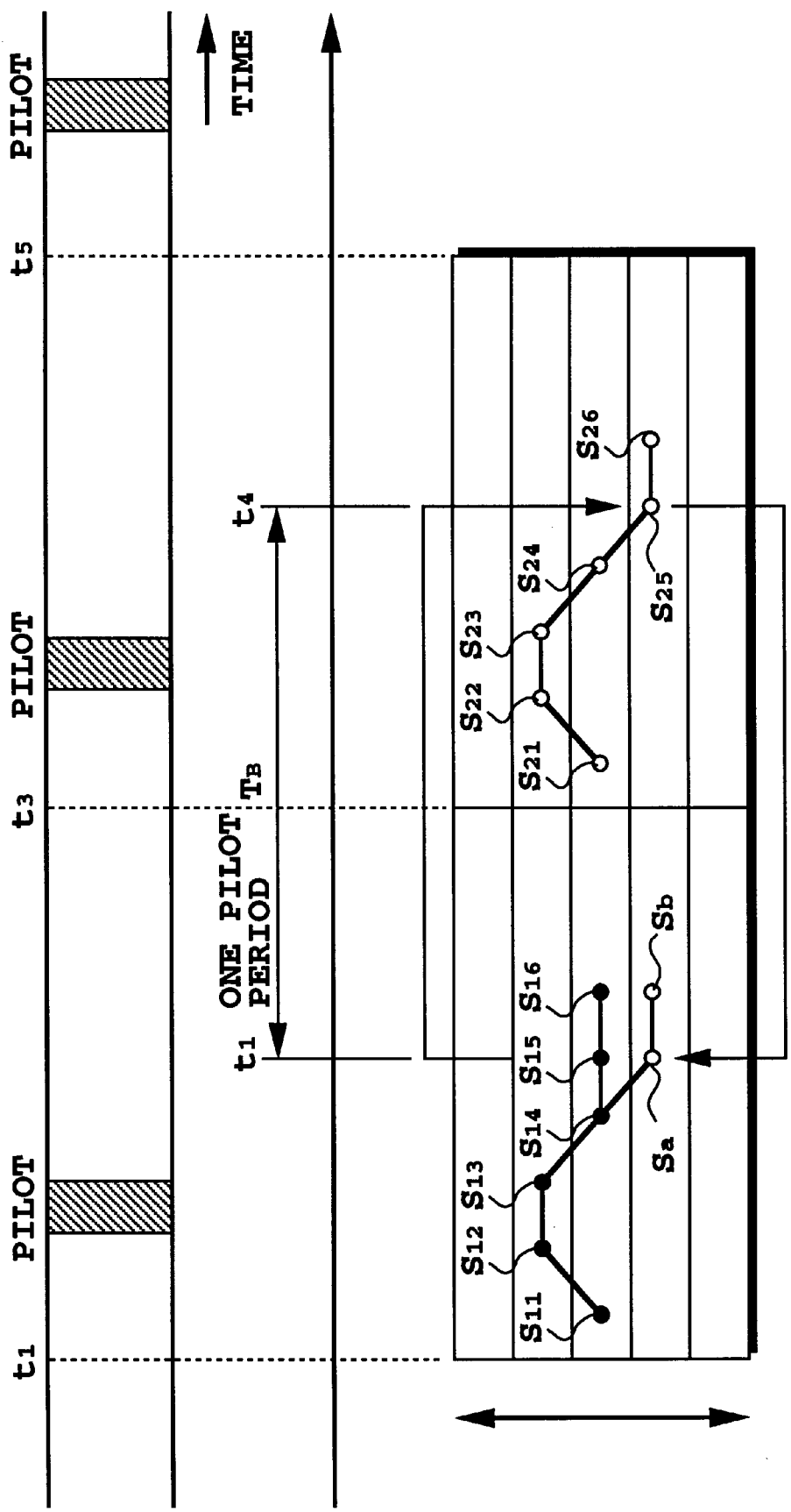
FIG. 16 is a diagram illustrating a floating averaging method in the fourth embodiment.

FIGS. 15 and 16 are diagrams illustrating a method for generating the phase error signal of the spreading code replica. The following two methods are used as the method for generating the phase error signal.

(1) A fixed averaging method

It is a method for generating the phase error signal while fixing the phase of the spreading code replica during each pilot period.

(2) A floating averaging method

It is a method for shifting the phase of the spreading code replica when the number of phase error signals with their phase advanced or retarded exceeds the reference value among L symbols consisting of the current symbol and its preceding symbols. Thus, a demand for the shift of the spreading code replica is checked for each symbol regardless of the pilot symbol or the information symbol.

FIG. 15 is a diagram illustrating the fixed averaging method when the number of the correlators of FIG. 14A is 5, that is, when N=2. In FIG. 15, the axis of abscissas represents time and the axis of ordinates represents the absolute phase of the spreading code replica. In FIG. 15, during one pilot period from time $t_1$ at which a first pilot signal has been received to time $t_2$ at which a second pilot signal has been received, a spreading code replica $C_{13}$ is used as the demodulation spreading code replica, and a pair of replicas C12 and $C_{14}$ with their phases shifted by $\pm \Delta$ from the phase of the replica $C_{13}$ are used as the tracking spreading code replicas. When a command to shift the phase of the spreading code replica by $-\Delta$ is fed from the phase error signal averaging block 260 of spreading code replica to the spreading code replica generator 305 and the correlation signal holding/selecting block 520, the spreading code replica with its phase shifted by $-\Delta$ is adopted during the next pilot period $t_2$–$t_3$. That is, a spreading code replica $C_{23}$ is used as the demodulation spreading code replica, and spreading code replicas $C_{22}$ and $C_{24}$ are used as the tracking spreading code replica. Here, $C_{23}=C_{14}$, $C_{22}=C_{13}$, and $C_{24}=C_{15}$.

FIG. 16 is a diagram illustrating the floating averaging method, wherein the number of the correlators of FIG. 14A is 5, that is when N=2. In FIG. 16, the axis of abscissas represents time and the axis of ordinates represents the absolute phase of the spreading code replica. Here, L=Np+Ns. More specifically, the phase error signal averaging block 260 of spreading code replica handles the phase error signals $e_3$ of Np pilot symbols and Ns information data symbols from the current symbol to one pilot period preceding symbol, and commands the phase shift when the number of the phase error signals $e_3$ indicating the advance or lag exceeds a threshold value.

In FIG. 16, the data decision is carried out one pilot period TB after the correlation detection. For example, the correlation detection is performed with the spreading code replica $S_{25}$ at time $t_4$, and the data decision is performed on the symbol which is despread with the spreading code replica $S_{15}$ at one pilot period before. Since the correction (reverse modulation) of the phase error signal $e_2$ by the decided code corrector 150 uses the decision data, it is also carried out with the symbol which is despread with the spreading code replica S15 at one pilot period before the correlation detection.

Assuming that the symbol despread with the spreading code replica $S_{15}$ at time $t_2$ is decided at time $t_4$, and that a command is issued to shift the spreading code replica by $-\Delta$ on the basis of the phase error signal $e_3$ which has been corrected by the decision result, the phase of the spreading code replica is shifted by $-\Delta$ as shown by $S_{24}$–$S_{25}$. As a result, the data decision one pilot period after time $t_4$ is performed on the symbol which is despread with the spreading code replica $S_{25}$.

In this embodiment, if it is expected that the phase shift of the spreading code replica occurs X times during preceding L symbols, the phase shift of the spreading code replica is carried out by generating the total of $\{2(X+1)+1\}X$ correlation values by using the spreading code replica inphase with the received spreading code and the spreading code replicas having phase differences of $\pm(X+1)\Delta$ from the inphase replica. The correlation signal holding/selecting block 520 holds these correlation values. The total number L of the observed symbols depends on the variation rate of the delay profile of propagation. High rate delay profile will require to set the value L at a smaller value because it is necessary to follow the variations in a short time. Generally, the number L is set at a small value to limit the number of phase shifts of the spreading code replica to a few times during the observed symbols L. Accordingly, the circuit dimension becomes modest.

EMBODIMENT 5

Figure 17:
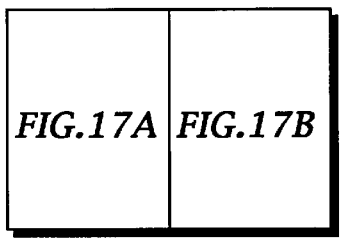
FIG. 17 shows arrangement of FIGS. 17A and 17B.
Figure 17A:
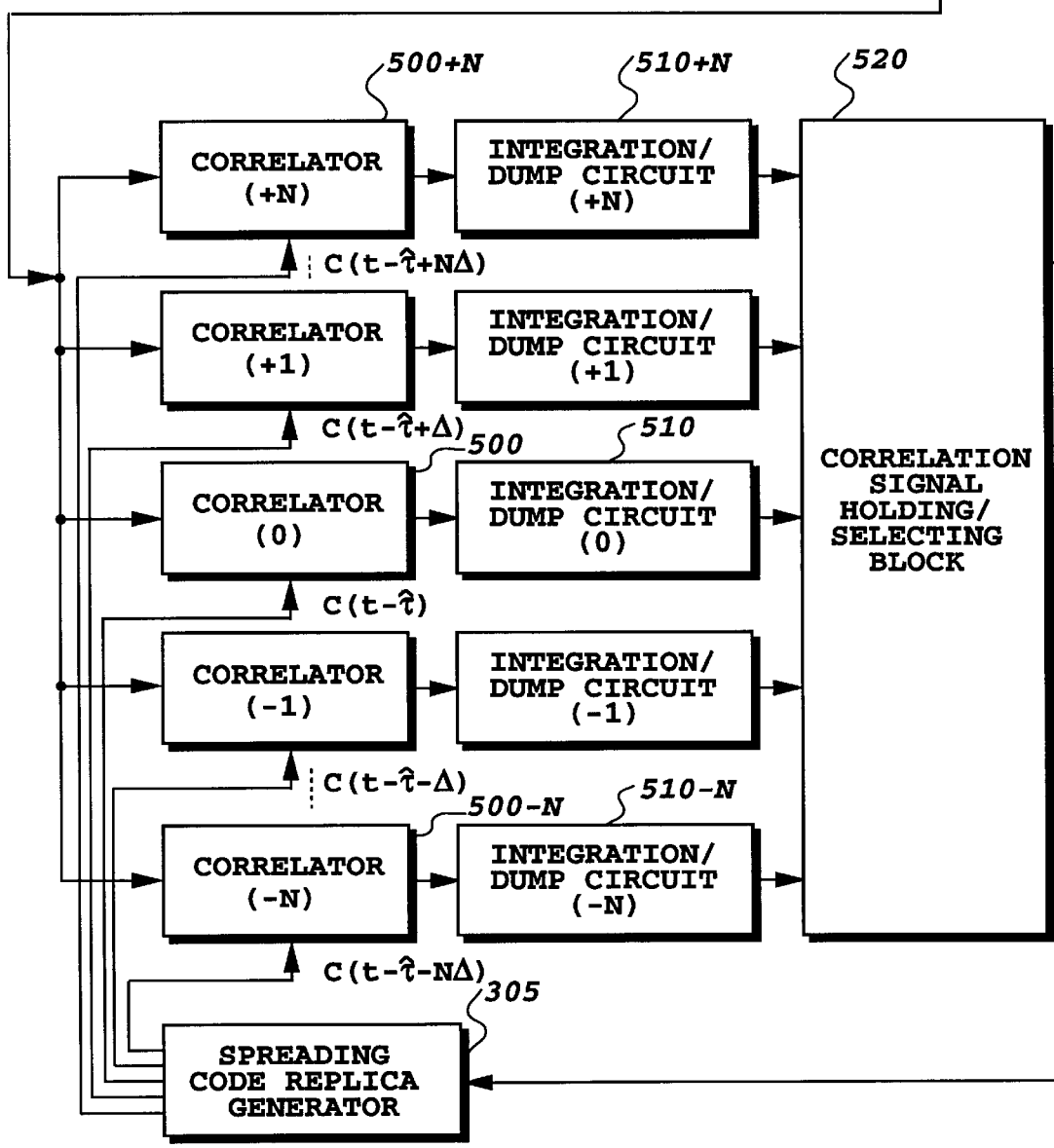
FIGS. 17A and 17B are block diagrams showing a fifth embodiment of the coherent tracking apparatus for the CDMA receiver in accordance with the present invention.
Figure 17B:
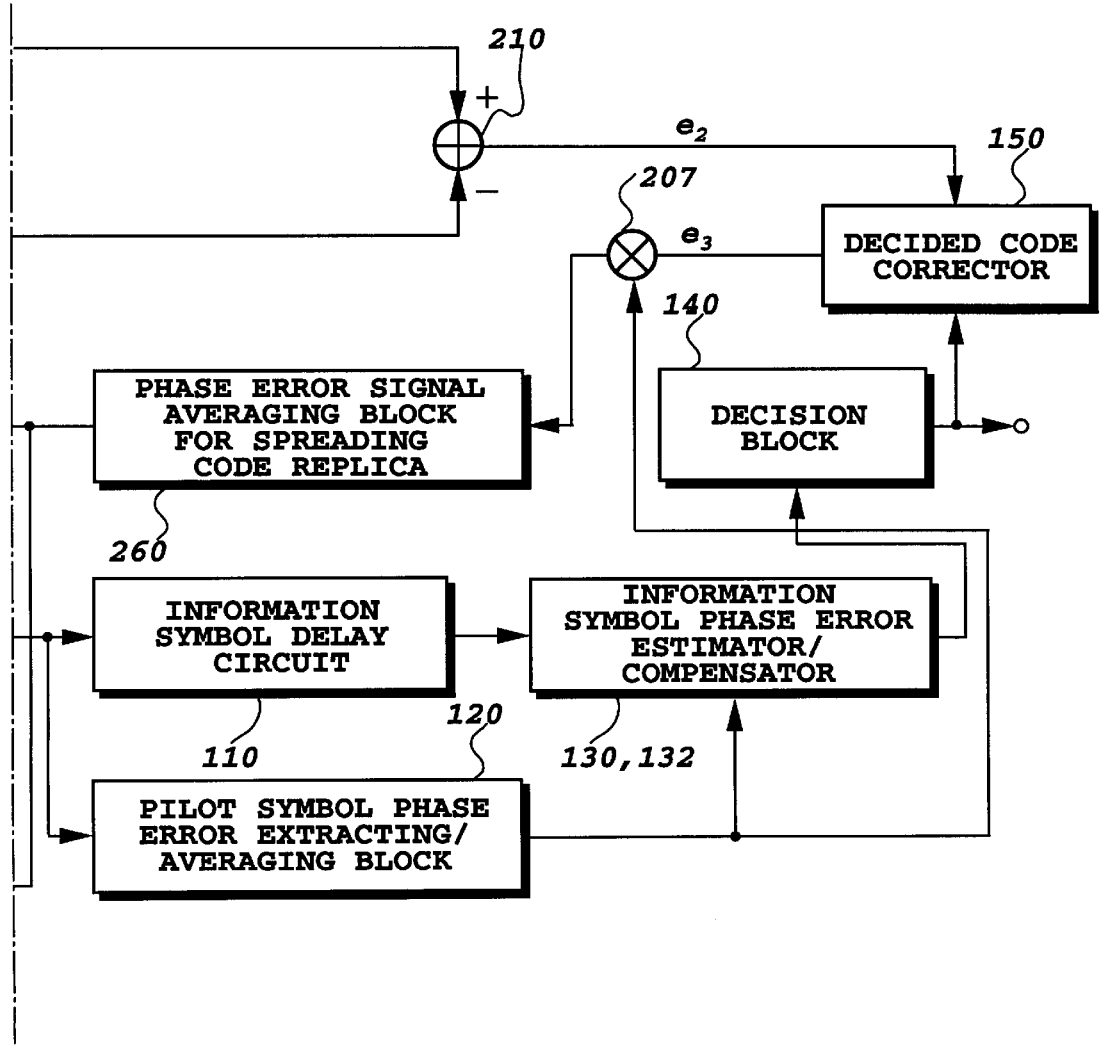

FIGS. 17A and 17B are block diagrams showing a fifth embodiment of the coherent tracking apparatus of the CDMA receiver in accordance with the present invention. This embodiment differs from the fourth embodiment as shown in FIGS. 14A and 14B in that the compensator 207 of the phase variations due to fading is connected to the output side of the decided code corrector 150. Although this will reverse the order of the compensation of the phase variations due to fading and the removal of the modulated components of the pilot signal to that of the fourth embodiment, this embodiment can achieve the effect and advantage similar to those of the fourth embodiment.

What is claimed is:

1. A coherent tracking apparatus for a CDMA receiver for use in a CDMA system that performs multiple access transmission by transmitting and receiving a spread signal, said spread signal being generated by spreading a pilot signal of a known pattern and an information data signal into a wideband signal with a spreading code whose rate is higher than a rate of an information symbol, said pilot signal and said information data signal being alternated at a fixed pilot period, said coherent tracking apparatus comprising:

demodulation spreading code replica generating means for generating a demodulation spreading code replica inphase with a spreading code in a received spread signal;

tracking spreading code replica generating means for generating at least a pair of tracking spreading code replicas whose phases are equal to a phase of said demodulation spreading code replica plus and minus a predetermined value, respectively;

demodulation correlator means for detecting correlation between said received spread signal and said demodulation spreading code replica;

phase error detection means for extracting said pilot signal from an output of said demodulation correlator means, and for detecting phase errors of said pilot signal;

first delay means for delaying by at least said pilot period said information data signal in the output of said demodulation correlator means;

first phase compensator for compensating each symbol of said information data signal output from said first delay means by interpolating said phase errors of said pilot signal into a section of said information data signal;

demodulation means for demodulating each symbol of said information data signal by deciding an output of said first phase compensator;

at least a pair of tracking correlator means for detecting correlation between said received spread signal and said tracking spreading code replicas;

an adder for adding outputs of said tracking correlator means in opposite phases to produce a first phase error signal;

second delay means connected to one of an output of said tracking correlator means and an output of said adder for delaying said first phase error signal by at least said pilot period;

reverse modulation means for reversely modulating said first phase error signal with an output of said demodulation means to remove modulated components of said information data signal, which are included in said first phase error signal, thereby producing a second phase error signal; and control means for controlling said demodulation spreading code replica generating means and said tracking spreading code replica generating means with said second phase error signal.

2. The coherent tracking apparatus for the CDMA receiver as claimed in claim 1, further comprising a second phase compensator connected between said tracking correlator means and said adder, wherein said adder adds outputs of said second phase compensator in opposite phases.

3. The coherent tracking apparatus for the CDMA receiver as claimed in claim 1, further comprising a second phase compensator connected between said reverse modulation means and said control means.

4. The coherent tracking apparatus for the CDMA receiver as claimed in claim 1, wherein said demodulation spreading code replica generating means and said tracking spreading code replica generating means comprise a common voltage controlled clock generator.

5. The coherent tracking apparatus for the CDMA receiver as claimed in claim 4, wherein said control means comprises a loop filter for supplying said voltage controlled clock generator with a control voltage based on said second phase error signal.

6. The coherent tracking apparatus for the CDMA receiver as claimed in claim 1, wherein said demodulation correlator means comprises a multiplier for multiplying said received spread signal by said demodulation spreading code replica, and an integration/dump circuit for integrating an output of said multiplier for one symbol period, and wherein said tracking correlator means comprises a multiplier for multiplying said received spread signal by said tracking spreading code replica, and an integration/dump circuit for integrating an output of said multiplier for one symbol period.

7. The coherent tracking apparatus for the CDMA receiver as claimed in claim 1, wherein said tracking spreading code replica generating means generates a plurality of tracking spreading code replicas whose phases are shifted by $\pm K\Delta$ from the phase of said demodulation spreading code replica, where $\Delta$ is a predetermined value and K=1, 2, . . . N, and wherein said coherent tracking apparatus further comprising:

selection means for selecting two correlation values from an output of said tracking correlator means to supply said adder with said two correlation values, said two correlation values being taken between said received spread signal and a pair of tracking spreading code replicas whose phases differ from the phase of said demodulation spreading code replica by $\pm\Delta$.

8. The coherent tracking apparatus for the CDMA receiver as claimed in claim 7, wherein said controlling means generates a third phase error signal by averaging said second phase error signal, and commands said modulation spreading code replica generating means and said tracking data spreading code replica generating means to shift phases of said modulation spreading code replica and said tracking spreading code replica when said third phase error signal exceeds a predetermined threshold value.

9. The coherent tracking apparatus for the CDMA receiver as claimed in claim 8, wherein said selection means shifts selection of said demodulation spreading code replica and said tracking spreading code replicas in response to a command of said controlling means when said controlling means commands a shift of said phases.

10. A coherent tracking apparatus for a CDMA receiver for use in a CDMA system that performs multiple access transmission by transmitting and receiving a pilot spread signal through a pilot channel, and information data spread signal through traffic channels, said pilot spread signal being generated by spreading a pilot signal of a known pattern into a wideband signal with a pilot spreading code whose rate is higher than a rate of an information symbol, said information data spread signal being generated by spreading an information data signal into a wideband signal with an information data spreading code different from said pilot spreading code, said coherent tracking apparatus comprising:

pilot spreading code replica generating means for generating a pilot spreading code replica inphase with a pilot spreading code in said pilot spread signal;

information data spreading code replica generating means for generating an information data spreading code replica inphase with an information data spreading code in said information data spread signal;

tracking spreading code replica generating means for generating a pair of tracking spreading code replicas whose phases are equal to a phase of said pilot spreading code replica plus and minus a predetermined value Δ, respectively;

pilot correlator means for detecting correlation between said pilot spread signal and said pilot spreading code replica;

phase error detection means for detecting phase errors of said pilot signal from an output of said pilot correlator means;

information data correlator means for detecting correlation between said information data spread signal and said information data spreading code replica;

first phase compensator for compensating individual symbols of said information data signal output from said information data correlator means by said phase errors of said pilot signal, said phase errors corresponding to said individual symbols of said information data signal;

demodulation means for demodulating each symbol of said information data signal by deciding an output of said first phase compensator;

a pair of tracking correlator means for detecting correlation between said pilot spread signal and said tracking spreading code replicas;

an adder for adding outputs of said tracking correlator means in opposite phases to produce a first phase error signal;

reverse modulation means for reversely modulating said first phase error signal with an output of said phase error detection means to remove modulated components of said information data signal, which are included in said first phase error signal, thereby producing a second phase error signal; and control means for controlling said pilot spreading code replica generating means, said information data spreading code replica generating means and said tracking spreading code replica generating means with said second phase error signal.

11. The coherent tracking apparatus for the CDMA receiver as claimed in claim 10, further comprising a second phase compensator connected between said tracking correlator means and said adder, wherein said adder adds outputs of said second phase compensator in opposite phases.

12. The coherent tracking apparatus for the CDMA receiver as claimed in claim 10, further comprising a second phase compensator connected between said reverse modulation means and said control means.

13. The coherent tracking apparatus for the CDMA receiver as claimed in claim 10, wherein said pilot spreading code replica generating means, said demodulation spreading code replica generating means and said tracking spreading code replica generating means comprise a common voltage controlled clock generator.

14. The coherent tracking apparatus for the CDMA receiver as claimed in claim 13, wherein said control means comprises a loop filter for supplying said voltage controlled clock generator with a control voltage based on said second phase error signal.

15. The coherent tracking apparatus for the CDMA receiver as claimed in claim 10, wherein said pilot correlator comprises a multiplier for multiplying said received spread signal by said pilot spreading code replica, and an integration/dump circuit for integrating an output of said multiplier for one symbol period, wherein said demodulation correlator means comprises a multiplier for multiplying said received spread signal by said demodulation spreading code replica, and an integration/dump circuit for integrating an output of said multiplier for one symbol period, and wherein said tracking correlator means comprises a multiplier for multiplying said received spread signal by said tracking spreading code replica, and an integration/dump circuit for integrating an output of said multiplier for one symbol period.

16. A coherent tracking method for a CDMA receiver for use in a CDMA system that performs multiple access transmission by transmitting and receiving a spread signal, said spread signal being generated by spreading a pilot signal of a known pattern and an information data signal into a wideband signal with a spreading code whose rate is higher than a rate of an information symbol, said pilot signal and said information data signal being alternated at a fixed pilot period, said coherent tracking method comprising:

demodulation spreading code replica generating step of generating a demodulation spreading code replica inphase with a spreading code in a received spread signal;

tracking spreading code replica generating step of generating at least a pair of tracking spreading code replicas whose phases are equal to a phase of said demodulation spreading code replica plus and minus a predetermined value, respectively;

demodulation correlation step of detecting correlation between said received spread signal and said demodulation spreading code replica;

phase error detection step of extracting said pilot signal from an output of said demodulation correlation step, and for detecting phase errors of said pilot signal;

first delay step of delaying by at least said pilot period said information data signal in the output of said demodulation correlator step;

first phase compensation step of compensating each symbol of said information data signal output at said first delay step by interpolating said phase errors of said pilot signal into a section of said information data signal;

demodulation step of demodulating each symbol of said information data signal by deciding an output of said first phase compensation step;tracking correlation step of detecting correlation between said received spread signal and said tracking spreading code replicas;

adding step of adding outputs of said tracking correlator step in opposite phases to produce a first phase error signal;

second delay step of delaying said first phase error signal by at least said pilot period;

reverse modulation step of reversely modulating said first phase error signal with an output of said demodulation step to remove modulated components of said information data signal, which are included in said first phase error signal, thereby producing a second phase error signal; and control step of controlling said demodulation spreading code replica generating step and said tracking spreading code replica generating step with said second phase error signal.

17. The coherent tracking method for the CDMA receiver as claimed in claim 16, wherein said tracking spreading code replica generating step generates a plurality of tracking spreading code replicas whose phases are shifted by ±KΔ from the phase of said demodulation spreading code replica, where Δ is a predetermined value and K=1, 2, ... N, and wherein said coherent tracking method further comprising:

selection step of selecting two correlation values from an output of said tracking correlation step to supply said adding step with said two correlation values, said two correlation values being taken between said received spread signal and a pair of tracking spreading code replicas whose phases differ from the phase of said demodulation spreading code replica by +Δ.

18. A coherent tracking method for a CDMA receiver for use in a CDMA system that performs multiple access transmission by transmitting and receiving a pilot spread signal through a pilot channel, and information data spread signal through traffic channels, said pilot spread signal being generated by spreading a pilot signal of a known pattern into a wideband signal with a pilot spreading code whose rate is higher than a rate of an information symbol, said information data spread signal being generated by spreading an information data signal into a wideband signal with an information data spreading code different from said pilot spreading code, said coherent tracking method comprising:

pilot spreading code replica generating step of generating a pilot spreading code replica inphase with a pilot spreading code in said pilot spread signal;

information data spreading code replica generating step of generating an information data spreading code replica inphase with an information data spreading code in said information data spread signal;

tracking spreading code replica generating step of generating a pair of tracking spreading code replicas whose phases are equal to a phase of said pilot spreading code replica plus and minus a predetermined value Δ, respectively;

pilot correlation step of detecting correlation between said pilot spread signal and said pilot spreading code replica;

phase error detection step of detecting phase errors of said pilot signal from an output of said pilot correlation step;

information data correlation step of detecting correlation between said information data spread signal and said information data spreading code replica;

first phase compensation step of compensating individual symbols of said information data signal output from said information data correlation step by said phase errors of said pilot signal, said phase errors corresponding to said individual symbols of said information data signal;

demodulation step of demodulating each symbol of said information data signal by deciding an output of said first phase compensation step;tracking correlator steps of detecting correlation between said pilot spread signal and said tracking spreading code replicas;

adding step of adding outputs of said tracking correlator step in opposite phases to produce a first phase error signal;

reverse modulation step of reversely modulating said first phase error signal with an output of said phase error detection step to remove modulated components of said information data signal, which are included in said first phase error signal, thereby producing a second phase error signal; and control step of controlling said pilot spreading code replica generating step, said information data spreading code replica generating step and said tracking spreading code replica generating step with said second phase error signal.

* * * * *